United States Patent
Yamazaki et al.

(10) Patent No.: US 8,277,902 B2
(45) Date of Patent: Oct. 2, 2012

(54) METHOD FOR FORMING FILM AND METHOD FOR MANUFACTURING LIGHT EMITTING DEVICE

(75) Inventors: Shunpei Yamazaki, Tokyo (JP); Satoshi Seo, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 671 days.

(21) Appl. No.: 12/398,788

(22) Filed: Mar. 5, 2009

(65) Prior Publication Data
US 2009/0226631 A1 Sep. 10, 2009

(30) Foreign Application Priority Data
Mar. 7, 2008 (JP) .................. 2008-058563

(51) Int. Cl.
- C08J 7/04 (2006.01)
- C23C 14/28 (2006.01)
- H01J 9/00 (2006.01)

(52) U.S. Cl. .......... 427/510; 427/66; 427/146; 427/595; 427/596; 445/24; 430/7; 430/200; 430/201

(58) Field of Classification Search .................. 427/510, 427/22, 66, 595, 596, 146
See application file for complete search history.

(56) References Cited

U.S. PATENT DOCUMENTS

| | | | |
|---|---|---|---|
| 5,851,709 A * | 12/1998 | Grande et al. | ................. 430/7 |
| 5,937,272 A | 8/1999 | Tang | |
| 6,165,543 A | 12/2000 | Otsuki et al. | |
| 6,555,284 B1 | 4/2003 | Boroson et al. | |
| 6,566,032 B1 | 5/2003 | Boroson et al. | |
| 6,610,455 B1 | 8/2003 | Burberry et al. | |
| 6,695,029 B2 | 2/2004 | Phillips et al. | |
| 6,703,179 B2 | 3/2004 | Tyan | |
| 6,776,880 B1 | 8/2004 | Yamazaki | |
| 6,811,938 B2 | 11/2004 | Tutt et al. | |

(Continued)

FOREIGN PATENT DOCUMENTS
EP 0 883 190 A2 12/1998
(Continued)

OTHER PUBLICATIONS

Tetsuo Urabe et al.; 13.1: Invited Paper: "Technological Evolution for Large Screen Size Active Matrix OLED Display"; *SID Digest '07 : SID International Symposium Digest of Technical Papers*; vol. 38; pp. 161-164; 2007.

*Primary Examiner* — Michael Cleveland
*Assistant Examiner* — Francisco Tschen
(74) *Attorney, Agent, or Firm* — Fish & Richardson P.C.

(57) ABSTRACT

A method for forming a film in which throughput is improved and a desired pattern is obtained smoothly in stacking a plurality of material layers over a substrate and a method for manufacturing a light emitting device are provided. In advance, a material layer is formed selectively by a droplet discharge method to be in contact with a light absorption layer on a first substrate. A second substrate is disposed so that the material layer faces the second substrate. The light absorption layer is irradiated with a laser light so that a film containing a material included in the material layer is formed on the second substrate. When the light absorption layer have a desired pattern, a film reflecting the pattern of the light absorption layer that has undergone the laser light irradiation is formed on the second substrate.

15 Claims, 11 Drawing Sheets

U.S. PATENT DOCUMENTS

| | | |
|---|---|---|
| 6,939,660 B2 | 9/2005 | Tutt et al. |
| 7,015,503 B2 | 3/2006 | Seki et al. |
| 7,214,959 B2 | 5/2007 | Seki et al. |
| 7,265,489 B2 | 9/2007 | Yamasaki et al. |
| 7,273,801 B2 | 9/2007 | Seki et al. |
| 7,288,420 B1 | 10/2007 | Yamazaki et al. |
| 7,442,955 B2 | 10/2008 | Seki et al. |
| 7,674,749 B2 | 3/2010 | Kang et al. |
| 7,691,783 B2 | 4/2010 | Matsuda et al. |
| 7,932,518 B2 | 4/2011 | Seki et al. |
| 7,994,021 B2 | 8/2011 | Miyairi et al. |
| 8,080,811 B2 | 12/2011 | Yokoyama et al. |
| 2004/0056266 A1* | 3/2004 | Suh et al. ............ 257/99 |
| 2004/0067302 A1 | 4/2004 | Burberry et al. |
| 2004/0191564 A1 | 9/2004 | Kim et al. |
| 2004/0206307 A1 | 10/2004 | Boroson et al. |
| 2004/0217695 A1 | 11/2004 | Yoneda et al. |
| 2005/0145326 A1 | 7/2005 | Hatwar |
| 2005/0157157 A1 | 7/2005 | Tsukamoto et al. |
| 2005/0189883 A1 | 9/2005 | Suh et al. |
| 2006/0084006 A1* | 4/2006 | Kang et al. ............ 430/199 |
| 2006/0243377 A1 | 11/2006 | Matsuo et al. |
| 2006/0246240 A1* | 11/2006 | Matsuda et al. ........ 428/32.39 |
| 2006/0246693 A1* | 11/2006 | Tanaka et al. ............ 438/487 |
| 2008/0299496 A1 | 12/2008 | Hirakata et al. |
| 2008/0305287 A1 | 12/2008 | Ohata et al. |
| 2009/0075214 A1 | 3/2009 | Hirakata et al. |
| 2009/0104403 A1 | 4/2009 | Aoyama et al. |
| 2009/0104835 A1 | 4/2009 | Aoyama et al. |
| 2009/0197017 A1 | 8/2009 | Tanaka et al. |
| 2009/0220706 A1 | 9/2009 | Yamazaki et al. |
| 2009/0221107 A1 | 9/2009 | Yamazaki et al. |
| 2011/0275191 A1 | 11/2011 | Miyairi et al. |

FOREIGN PATENT DOCUMENTS

| | | |
|---|---|---|
| EP | 0 989 778 A1 | 3/2000 |
| EP | 1 176 642 A2 | 1/2002 |
| EP | 1 408 564 A2 | 4/2004 |
| EP | 1 650 046 A1 | 4/2006 |
| EP | 1 787 822 A2 | 5/2007 |
| EP | 1 793 650 A2 | 6/2007 |
| JP | 11-054275 A | 2/1999 |
| JP | 2000-256877 | 9/2000 |
| JP | 2001-052864 | 2/2001 |
| JP | 2001-102170 | 4/2001 |
| JP | 2003-077658 A | 3/2003 |
| JP | 2003-185823 A | 7/2003 |
| JP | 2004-103406 | 4/2004 |
| JP | 2004-134404 A | 4/2004 |
| JP | 2006-086128 A | 3/2006 |
| JP | 2006-123546 A | 5/2006 |
| JP | 2006-228649 | 8/2006 |
| JP | 2006-244944 | 9/2006 |
| JP | 2006-309995 A | 11/2006 |
| JP | 2007-005177 A | 1/2007 |
| JP | 2008-053698 A | 3/2008 |
| JP | 2009-146716 A | 7/2009 |

* cited by examiner

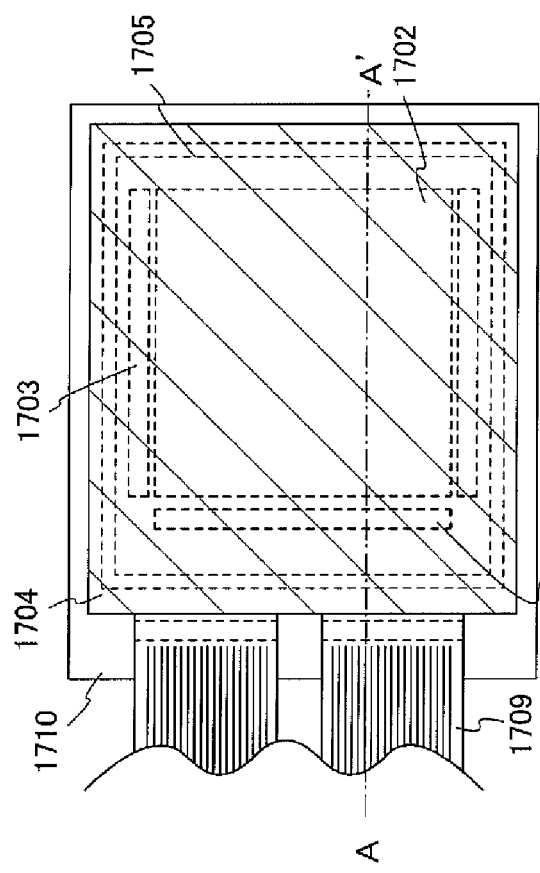
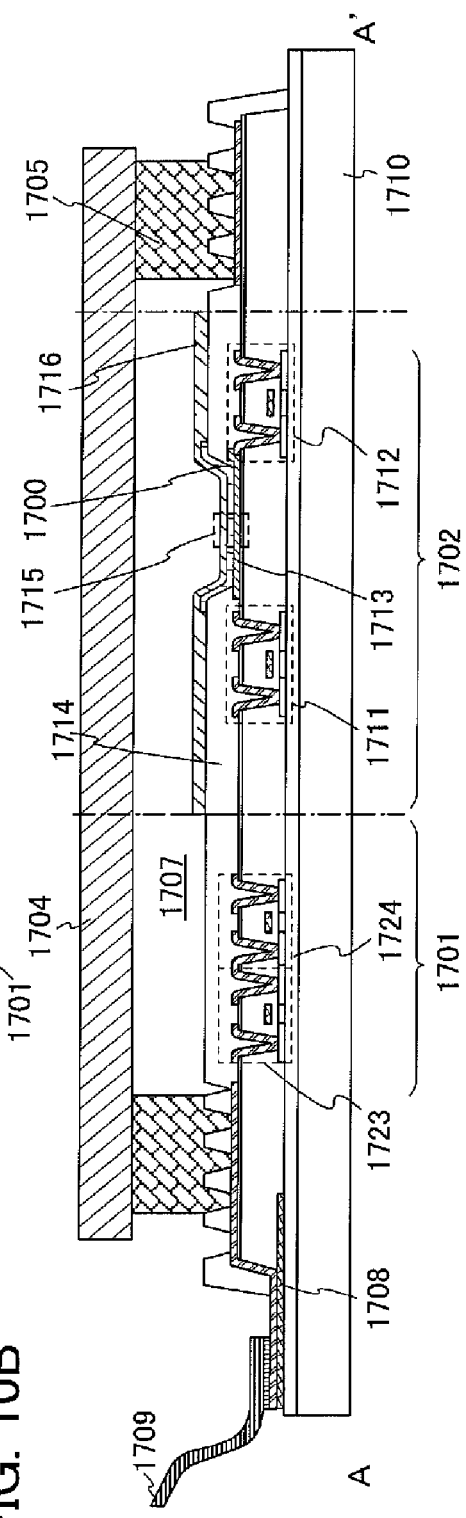
FIG. 10A
FIG. 10B

METHOD FOR FORMING FILM AND METHOD FOR MANUFACTURING LIGHT EMITTING DEVICE

BACKGROUND OF THE INVENTION

1. Field of the Invention

The present invention relates to a method for forming a layer including an organic compound, and further, to a method for manufacturing a light emitting device in which the layer including the organic compound functions as a light emitting layer.

2. Description of the Related Art

A light emitting element in which an organic compound is used as a light emitting body and has characteristics such as low profile, lightness in weight, high speed response, and DC drive at a low voltage is expected to be applied to a next-generation flat panel display. In particular, a display device in which light emitting elements are arranged in a matrix is thought to be superior to a conventional liquid crystal display device in that it has a wide viewing angle and excellent visibility.

It is said that a light emission mechanism of a light emitting element is as follows: when a voltage is applied between a pair of electrodes with an EL layer interposed therebetween, electrons injected from a cathode and holes injected from an anode are recombined at emission centers in the EL layer to form molecular excitons, and energy is released when the molecular excitons relax to the ground state, so that the light emitting element emits light. As excited states, a singlet excited state and a triplet excited state are known, and light emission is possible through either of these excited states.

An EL layer included in a light emitting element has at least a light emitting layer. In addition to a light emitting layer, an EL layer can have a stacked-layer structure including a hole injecting layer, a hole transporting layer, an electron transporting layer, an electron injecting layer, and/or the like.

EL materials for forming an EL layer are broadly classified into low-molecular (monomer) materials and high-molecular (polymer) materials. In general, a film of a low-molecular material is often formed by an evaporation method, and a film of a high-molecular material is often formed by an inkjet method, a spin coating method, or the like.

Reference 1 (Japanese Published Patent Application No. 2001-52864) and Reference 2 (Japanese Published Patent Application No. 2001-102170) have disclosed formation of an EL layer by an inkjet method.

SUMMARY OF THE INVENTION

In a droplet discharge method, which is typified by an inkjet method, a liquid is prepared in which a material for forming a film is dissolved or dispersed in a solvent or the like in order to discharge the liquid including the material out of a nozzle, and the liquid is discharged out of the nozzle to form a film on a substrate. By an inkjet method, a film can be formed selectively by controlling the amount of a droplet to discharge out of a nozzle or the discharge position of a droplet.

Also in a case of a spin coating method, a dipping method, a doctor blade method, or the like, a liquid including a material is prepared.

When such a wet process is used, it is difficult to form a stacked-layer structure. For example, when a first material layer, which is a first layer, is formed and then a second material layer, which is a second layer, is stacked thereon, a surface of the first material layer, which is the first layer, tends to melt and an organic material included in the first material layer can mix with the second material layer.

Further, in such a wet process, drying treatment for evaporating a solvent or the like is performed whenever a layer has been stacked on a substrate treated; since it takes 30 minutes to 1 hour or more to perform the drying treatment, the throughput decreases as the number of stacked layers increases. Furthermore, the baking temperature varies depending on the material or solvent used; therefore, for example, when the baking temperature of a top material layer is higher than the melting point of a lower material layer, the interface can be lost and the layers can unintentionally mix with each other.

In view of the above problems, an object is to provide a method for forming a film by which the throughput is improved and a desired pattern of a material layer is formed smoothly in stacking a plurality of different material layers on a substrate, and a method for manufacturing a light emitting device.

In advance, material layers are formed selectively by a droplet discharge method so as to overlap with light absorption layers on a first substrate. The first substrate is placed to face a second substrate, which is a deposition target substrate, and the light absorption layers are heated by laser light irradiation to form films on the second substrate. If the light absorption layers have a desired pattern, films having a pattern which reflects the pattern of the light absorption layers to which the laser light has been applied are formed on the second substrate. A film containing a material included in the material layer and having a pattern almost the same as the pattern of the light absorption layer can be obtained on the second substrate.

When a droplet discharge method is used, waste of a material can be reduced, and the amount and position can be controlled accurately. Further, it is also possible to scan a first substrate, on which different material layers are stacked or a mixed layer of different materials is formed by a droplet discharge method in advance, with light to form a mixed layer on a face of a second substrate, which faces the first substrate. According to the present invention, a mixed layer can also be formed intentionally.

Further, it is also possible to form material layers selectively by a droplet discharge method again on the first substrate which has been irradiated with the laser light, to use the first substrate repeatedly. By utilizing the first substrate repeatedly without removing remaining material layers, the productivity can be improved. Furthermore, it is also possible to form material layers selectively by a droplet discharge method after removing remaining material layers by cleaning the first substrate every time in order to prevent entrance of impurities or to make the thickness of the layer uniform.

To form the material layers on the first substrate in advance, it is preferable to perform dripping by a droplet discharge method under an atmospheric pressure and heating for drying under a reduced pressure, more preferably, at $10^{-4}$ Pa to $10^{-6}$ Pa inclusive. If the first substrate is aligned with the second substrate in a short time, it is also possible to irradiate the first substrate that has been heated under a reduced pressure and has not been cooled down yet because the laser light irradiation is performed under a reduced pressure. When the first substrate that is not cooled down is irradiated with the laser light, a laser light source with low output power or a laser condition with a wide margin can be used to form films on the second substrate.

As the laser light, laser light with a repetition rate of greater than or equal to 10 MHz and a pulse width of 100 fs to 10 ns inclusive is used. By using laser light with such a very high repetition rate and such a very small pulse width, heat conversion is performed efficiently in the light absorption layers and the material can be heated efficiently. The wavelength of the laser light used is not limited in particular, and laser light with various wavelengths can be used. For example, laser light with a wavelength of 355 nm, 515 nm, 532 nm, 1030 nm, 1064 nm, or the like can be used.

The laser light is applied from a rear face (a face on which neither the light absorption layers nor the material layers are formed) side of the first substrate. At this time, light onto the material layers passes therethrough while light onto the light absorption layers formed on the first substrate is absorbed therein. The light absorption layers convert the absorbed light into heat and feed the heat to a material included in regions of the material layers which are in contact with the light absorption layers, whereby films of at least part of the material included in the regions of the material layers which are in contact with the light absorption layers are formed on the second substrate.

The material layers dripped by a droplet discharge method are baked in advance on the first substrate. Therefore, the time involved in forming the films on the second substrate, which is the deposition target substrate, includes at least the time involved in aligning the first substrate with the second substrate and the scanning time of the laser light; thus, the throughput can be improved.

Further, even if a part of the material layers remains unbaked after forming the material layers on the first substrate and baking them, the films can be formed on the second substrate without any problem through film formation treatment, i.e., laser light irradiation. Since the material that has already been baked is further heated to be evaporated, sublimation purification is substantially performed, so that the films can have high quality.

A disadvantage of a droplet discharge apparatus is that if a nozzle is clogged for some reason and a droplet fails to be discharged at a desired position, a display panel having a point defect or a line defect, which is a defective, is produced. In a conventional film formation method, a pattern is formed directly on a target substrate having TFTs, for example; therefore, if a nozzle is clogged, the target substrate having the TFTs itself is regarded as a defective. On the other hand, in the present invention, droplets are discharged on an evaporation donor substrate; thus, evaporation donor substrates on which droplets have been discharged when a nozzle is clogged undergo screening, and only an evaporation donor substrate on which droplets have been discharged normally is irradiated with laser light, whereby films can be formed on a deposition target substrate having TFTs with reliability. A deposition target substrate having TFTs tends to cost high even before forming EL layers because a process for forming a deposition target substrate having TFTs is complex. Therefore, it is highly important not to produce a defective deposition target substrate having TFTs in reducing the manufacturing cost.

Further, evaporation donor substrates on which droplets have been discharged when a nozzle is clogged can undergo screening, and such a defective substrate can be cleaned, and droplets can be dripped on the substrate again; in such a manner, cleaning and discharging can be repeated until droplets are discharged normally on the evaporation donor substrate, so that evaporation donor substrates on which droplets have been dripped normally can be prepared.

An aspect of the present invention disclosed in this specification is a method for forming a film which includes the steps of selectively forming a light absorption layer on one surface of a first substrate; selectively forming a material layer in contact with the light absorption layer; disposing a second substrate so that the one surface of the first substrate faces a second substrate; and irradiating the light absorption layer with a light from the other surface of the first substrate to selectively heat at least a part of the material layer in contact with the light absorption layer, whereby a film is formed on the second substrate.

In the present invention, at least one of the above objects is solved.

If a prepared liquid has a low viscosity, the liquid can spread on discharging it onto a first substrate; thus, it can be difficult to obtain a material layer which has a desired thickness and overlaps with a light absorption layer. Further, if adjacent light absorption layers are present close to each other, the liquid can spread and a material layer can be formed over a plurality of light absorption layers.

Therefore, it is preferable to provide a partition to prevent a liquid from spreading over a portion surrounding a light absorption layer. Another aspect of the present invention is a method for forming a film which includes the steps of selectively forming a light absorption layer on one surface of a first substrate; selectively forming a partition surrounding the light absorption layer; selectively forming a material layer in a region which overlaps with the light absorption layer and is surrounded by the partition; making the one surface of the first substrate face a film formation surface of a second substrate; and irradiating the light absorption layer with a light from the other surface of the first substrate to selectively heat at least a part of the material layer which overlaps with the light absorption layer, whereby a film is formed on the film formation surface of the second substrate.

The partition provided for the first substrate is formed using an inorganic material or an organic material. Further, in order to prevent heat conduction, it is preferable to provide a space between the partition and the light absorption layer, and to form the partition using a material which can withstand the laser light irradiation and transmits the laser light.

Further, the partition provided for the first substrate may be in contact with the light absorption layer in a part; in such a case, it is preferable to use a material which withstands a temperature to which that of the light absorption layer reaches through the laser light irradiation.

Further, with the use of the partition, the volume of a space surrounded by the partition can be controlled accurately with the height of the partition; thus, a droplet is dripped in a region surrounded by the partition, and the amount of the liquid held in the region surrounded by the partition can be controlled. Therefore, it is preferable that the height of the partition be larger than the thickness of the light absorption layer. Even if the dripped liquid overflows the partition onto the outside thereof, the material outside the partition is not evaporated even when it is irradiated with the laser light. A droplet discharge method has an advantage of making it possible to precisely control the amount of a droplet discharged; when the partition is used, a droplet discharge method further has an advantage of making it possible to more precisely control the amount of liquid which is held on the substrate.

In order to enhance the uniformity of the thickness of the film formed on the second substrate, the uniformity of the thickness of the material layer on the light absorption layer on the first substrate is important. Therefore, it is preferable that the height of the partition be larger than the thickness of the light absorption layer. By making the height of the partition larger than the thickness of the light absorption layer, a region surrounded by the partition is filled with the liquid, and the liquid surface thereof is brought to a level in a region overlapping with the light absorption layer. Occasionally, a droplet discharged from an inkjet apparatus attaches a little off an intended position; however, if the droplet can be discharged into the region surrounded by the partition and the liquid surface is evened off in the region surrounded by the partition and then baking is performed, a uniform thickness can be obtained in the region surrounded by the partition.

Although the cross-sectional form of the partition is not limited in particular, a rectangle or a trapezoid is preferable. Further, a surface of the partition may undergo surface treatment for imparting a lyophilic property with respect to the liquid discharged. Alternatively, a surface of the partition may undergo surface treatment for imparting a lyophobic property with respect to the liquid discharged. With the influence of a side face of the partition, the thickness of the material layer near the side face tends to be larger than that of the center portion (the center portion of the region surrounded by the partition) when the surface of the partition is lyophilic, whereas the thickness of the material layer near the side face tends to be smaller than that of the center portion when the surface of the partition is lyophobic. Therefore, in order not to produce such a film with an uneven thickness in a part, a space can be provided between the partition and the light absorption layer.

Further, the second substrate is also provided with a partition for insulating electrodes. If the gap between the first substrate and the second substrate is narrow, the partition of the first substrate can come to be in contact with the partition of the second substrate. In such a case, both the partitions of the first and second substrates hold the gap between the first substrate and the second substrate.

The first substrate and the second substrate are aligned, whereby a given gap is held between the substrates for the laser light irradiation; the gap between the substrates is defined as the distance between the first and second substrates facing each other.

The light absorption layer can be formed using a variety of materials. For example, metal nitride such as titanium nitride, tantalum nitride, molybdenum nitride, or tungsten nitride, a metal such as titanium, molybdenum, or tungsten, carbon, or the like can be used. It is necessary to select a material as appropriate because the kind of a material suitable for the light absorption layer varies according to the wavelength of irradiation light. The light absorption layer is not limited to a single layer, and may be constituted of a plurality of layers. For example, a stacked-layer structure of a metal and metal nitride may be employed. The light absorption layer can be formed by a variety of methods. For example, a sputtering method, an electron beam evaporation method, a vacuum evaporation method, or the like can be employed.

The thickness of the light absorption layer varies according to the material; when the light absorption layer has a thickness that does not allow irradiation light to pass therethrough, the irradiation light can be converted into heat without waste. It is preferable that the light absorption layer have a thickness of 10 nm to 2 μm inclusive. Further, as the thickness of the light absorption layer becomes smaller, the entire light absorption layer can be heated with light having smaller energy. Therefore, it is more preferable that the light absorption layer have a thickness of 10 nm to 600 nm inclusive. For example, when the light absorption layer is irradiated with light having a wavelength of 532 nm, the thickness of the light absorption layer is set to be 50 nm to 200 nm inclusive, whereby the light absorption layer can efficiently absorb irradiation light and generate heat.

If the light absorption layer can be heated to a temperature which allows the material included in the material layer to form a film (a temperature which allows at least a part of the material included in the material layer to form a film on the deposition target substrate), part of the irradiation light may pass through the light absorption layer.

The top form of the light absorption layer is designed by a practitioner in accordance with a desired film formation pattern. For example, the light absorption layer is formed to have an island-like shape. When a light emitting device is manufactured, a plurality of light emitting elements used for the light emitting device are arranged in a matrix or a delta form; thus, the light absorption layer is formed to have an island-like shape in accordance with the arrangement.

In this specification, an inkjet method, a micro-dispense method, or the like can be used as a droplet discharge method.

For the laser light, laser light emitted from one or more of the following can be used: gas lasers such as an Ar laser, a Kr laser, and an excimer laser; and solid lasers such as a laser which utilizes, for a medium, single crystal YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ doped with one or more dopants such as Nd, Yb, Cr, Ti, Ho, Er, Tm, and Ta, a glass laser, a ruby laser, an alexandrite laser, a Ti:sapphire laser, and a fiber laser. Further, the second harmonic, the third harmonic, or a higher-order harmonic emitted from the above solid laser can also be used. A solid laser, whose laser medium is solid, has advantages that it is free of maintenance for a long time and is relatively stable in output.

Further, it is preferable that a laser spot have a linear or rectangular form. A linear or rectangular laser spot makes it possible to scan a treatment substrate with the laser light efficiently. Thus, the time it takes to form a film (takt time) is shortened, whereby the productivity is improved.

The above film formation method makes it possible to form at least one layer, e.g., a light emitting layer, of an EL layer constituting a light emitting element. Further, since a film can be formed only in a desired region, a minute pattern can be formed, so that a high-definition light emitting device can be manufactured.

When a full-color light emitting device is manufactured, it is necessary to form light emitting layers separately; the film formation method of the present invention makes it possible to separately form light emitting layers easily. Further, the film formation method of the present invention makes it possible to separately form the light emitting layers with favorable positional accuracy.

In addition to a light emitting layer, a stacked-layer structure including a hole injecting layer, a hole transporting layer, an electron transporting layer, an electron injecting layer, and/or the like can also be formed.

The terms of degrees used in this specification, for example, "substantially" and "almost," mean a reasonable degree of deviation of a term which is modified so as not to change the end result significantly. These terms should be construed as including a deviation of at least ±5% from the term modified if this deviation does not negate the meaning of the term modified.

Since it is not necessary to take account of solubility of a layer which has already been formed or the like, which is different from a case where an EL layer is formed by a conventional wet method, options of a kind of a material used for forming the film are broadened. Further, the number of layers stacked can also be set freely. Therefore, a light emitting device having a desired stacked-layer structure can be manufactured using a desired material. The fact that the kind of a material used or the stacked-layer structure can be designed freely is important in terms of improvement in performance of the light emitting device particularly when a substrate is large.

BRIEF DESCRIPTION OF THE DRAWINGS

In the accompanying drawings:

FIGS. 10A and 10B are drawings showing a structure of an active matrix light emitting device.

DETAILED DESCRIPTION OF THE INVENTION

Embodiment modes of the present invention are described below.

(Embodiment Mode 1)

This embodiment mode describes an evaporation donor substrate according to the present invention and a method for forming films using the evaporation donor substrate. Note that this embodiment mode describes a case where EL layers of light emitting elements are formed using an evaporation donor substrate. In this specification, a substrate which is provided with a material for forming films and is used to form the films on a deposition target substrate is referred as an evaporation donor substrate (a first substrate), hereinafter.

Figure 1A:
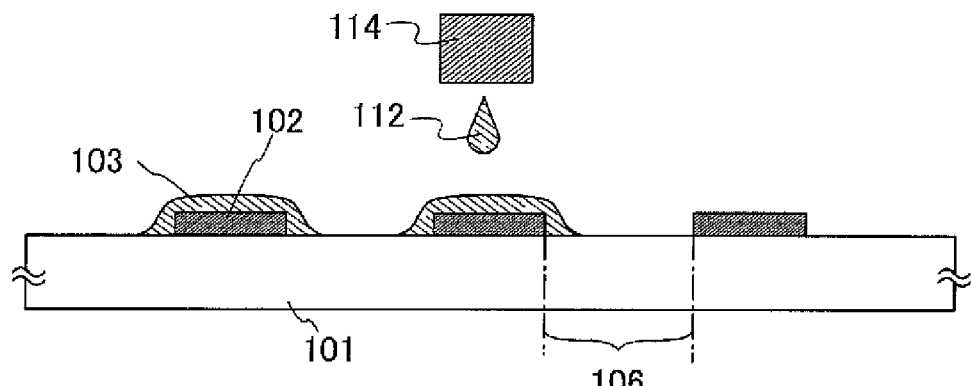
FIGS. 1A to 1C are cross-sectional views showing a method for forming films.

FIG. 1A shows an example of the evaporation donor substrate. As shown in FIG. 1A, light absorption layers 102 are formed on a first substrate 101, which is a supporting substrate. The light absorption layers 102 are formed in a pattern so as to correspond to regions where films are to be formed on the deposition target substrate. In FIG. 1A, the light absorption layers 102 are formed to have opening portions 106. Further, droplets 112 are selectively discharged onto the light absorption layers 102 out of a nozzle 114 of a droplet discharge apparatus, whereby material layers 103 including a material for forming the films on the deposition target substrate are formed. The droplets 112 include the material for forming the films on the deposition target substrate.

Figure 3:
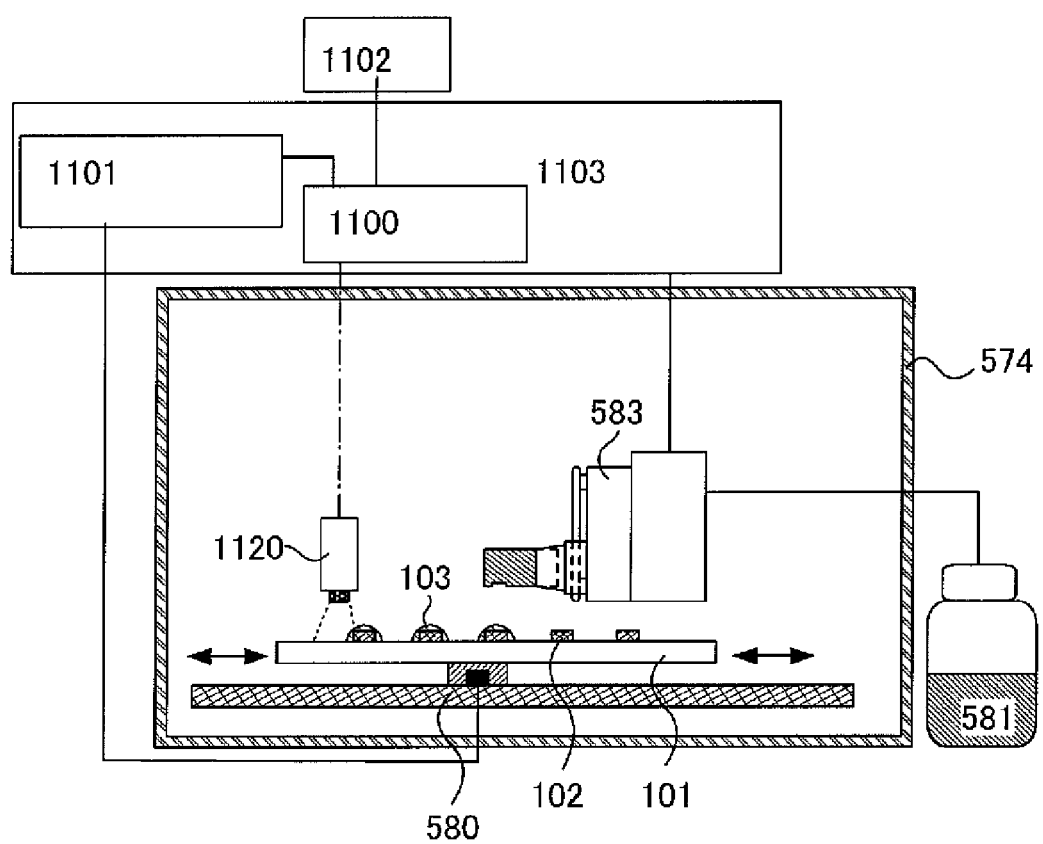
FIG. 3 is a cross-sectional view showing an example of a treatment chamber having a droplet discharge apparatus.

FIG. 3 is a schematic cross-sectional view of a treatment chamber having a droplet discharge apparatus. A treatment chamber 574 is provided with a droplet discharge apparatus. A droplet discharge unit 583 provided with a head having a plurality of nozzles arranged in an axial direction, a control portion 1103 that controls the droplet discharge unit 583, a stage 580 that fixes the first substrate 101 and moves in X, Y and θ directions, and the like are included. This stage 580 also has a function of fixing the first substrate 101 by vacuum chuck or the like. A composition is discharged to the first substrate 101 from a discharging outlet of each nozzle included in the droplet discharge unit 583 to form a pattern of the material layers 103 that overlap with the light absorption layers 102.

The control portion 1103 controls the stage 580 and the droplet discharge unit 583. The control portion 1103 includes a stage alignment portion 1101. Further, the control portion 1103 also controls an image pickup unit 1120 such as a CCD camera. The image pickup unit 1120 detects the position of a marker, and supplies the detected information to the control portion 1103. The detected information can be displayed in a monitor 1102. In addition, the control portion 1103 includes an alignment position control portion 1100. The composition is supplied from an ink bottle 581 to the droplet discharge unit 583.

In forming a pattern, the droplet discharge unit 583 may be moved, or the stage 580 may be moved with the droplet discharge unit 583 fixed. If the droplet discharge unit 583 is moved, acceleration of the composition, a distance between the nozzles provided for the droplet discharge unit 583 and an object to be processed, and the environment need to be considered.

In addition, although not shown in the drawing, a movement mechanism in which a head moves up and down, a control unit thereof, and the like may be provided as accompanying components in order to improve the positional accuracy of the discharged composition, which makes it possible to change the distance between the head and the first substrate 101 according to properties of the composition to be discharged. Further, a gas supply unit and a shower head may be provided, which makes it possible to substitute an atmosphere of the same gas of a solvent of the composition for the atmosphere, whereby drying can be prevented to some extent. Furthermore, a clean unit or the like for supplying clean air and reducing dust in a work area may be provided. Moreover, although not shown in the drawing, a unit for heating a substrate and a unit for measuring various values of physical properties such as temperature and pressure may be provided if necessary. These units can also be controlled collectively by the control unit provided outside a chassis. Furthermore, if the control unit is connected to a manufacturing management system or the like through a LAN cable, wireless LAN, an optical fiber, or the like, the process can be managed collectively from the outside, which leads to improvement in productivity. In order to dry the composition that has been discharged on the first substrate 101 in a shorter time and to remove a solvent component of the composition, vacuum evacuation may be performed to operate the apparatus under a reduced pressure.

In the present invention, when the films are formed using the material layers 103, it is necessary that light with which the first substrate 101 is irradiated pass through the first substrate 101; thus, it is preferable that the first substrate 101 have a high transmittance. That is, if laser light is used as the irradiation light, it is preferable to use a substrate that transmits the laser light as the first substrate 101. Further, it is preferable that the first substrate 101 be formed using a material with a low thermal conductivity. A substrate with a low thermal conductivity makes it possible to efficiently utilize heat obtained from the irradiation light for forming the film. As the first substrate 101, for example, a glass substrate, a quartz substrate, or the like can be used. Impurities (e.g., moisture) are less apt to be adsorbed or attached on a glass substrate, a quartz substrate, or the like than on a film substrate or the like. Therefore, a glass substrate, a quartz substrate, or the like makes it possible to prevent impurities from entering in forming the films.

The light absorption layers 102 absorb irradiation light in forming the films. Therefore, it is preferable to form the light absorption layers 102 using a material having a low reflectance and a high absorptance with respect to the irradiation light. Specifically, it is preferable that the light absorption layers 102 show a reflectance of less than or equal to 70% with respect to the irradiation light.

In this embodiment mode, titanium nitride is used for the light absorption layers 102. After forming a titanium nitride film by a sputtering method, a photolithography technique is used to etch the titanium nitride film selectively, thereby obtaining a desired pattern.

In this embodiment mode, further, laser light with a wavelength of 532 nm, a repetition rate of greater than or equal to 10 MHz, and a pulse width of 100 fs to 10 ns inclusive is used as the laser light. When irradiation is performed with light with a wavelength of 532 nm, light absorption layers 102 with a thickness of 50 nm to 200 nm inclusive can efficiently absorb the irradiation light and generate heat.

As the material included in the material layers 103, any material can be used regardless of whether it is an organic compound or an inorganic compound as long as a film thereof can be formed by a droplet discharge method. When an EL layer of a light emitting element is formed as described in this embodiment mode, a material with which the EL layer can be formed is used. For example, an organic compound such as a light emitting material or a carrier transporting material that constitutes the EL layer, a carrier injecting material, or an inorganic compound such as metal oxide, metal nitride, metal halide, or an elemental metal, which is used for an electrode of a light emitting element or the like, can be used.

The material layers 103 may include a plurality of materials. Further, the material layers 103 may be formed with a single layer or a plurality of layers. By stacking a plurality of layers including materials, it is possible to co-evaporate the materials and deposit films on the second substrate. By stacking the plurality of layers including the materials, it is possible to form mixed layers on the second substrate.

In the present invention, a desired material is dissolved or dispersed in a solvent to prepare a solution or a dispersion liquid because the material layers 103 are formed with a droplet discharge apparatus. After the droplets 112 are discharged onto the light absorption layers 102 out of the nozzle 114, drying or baking is performed in order to remove the solvent and the like. There is no particular limitation on the solvent as long as a material can be dissolved or dispersed therein and does not react with the solvent. Examples of the solvent are as follows: halogen solvents such as chloroform, tetrachloromethane, dichloromethane, 1,2-dichloroethane, and chlorobenzene; ketone solvents such as acetone, methyl ethyl ketone, diethyl ketone, n-propyl methyl ketone, and cyclohexanone; aromatic solvents such as benzene, toluene, and xylene; ester solvents such as ethyl acetate, n-propyl acetate, n-butyl acetate, ethyl propionate, γ-butyrolactone, and diethyl carbonate; ether solvents such as tetrahydrofuran and dioxane; amide solvents such as dimethylformamide and dimethylacetamide; dimethyl sulfoxide; hexane; water; and the like. A mixture of plural kinds of these solvents may also be used.

After performing the drying or baking for forming the material layers 103, it is preferable to perform heating under a reduced pressure in order to remove moisture on the first substrate.

Figure 1B:
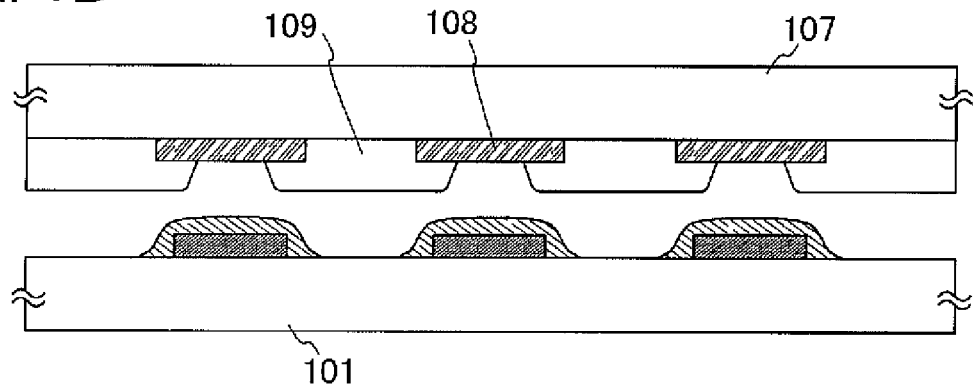

Next, as shown in FIG. 1B, a second substrate 107, which is a deposition target substrate, is placed so as to face a surface on which the light absorption layers 102 and the material layers 103 are formed. The second substrate 107 is the deposition target substrate on which desired layers are formed through the film formation process. In this embodiment mode, EL layers of light emitting elements are formed using the evaporation donor substrate; thus, first electrodes 108, which function as electrodes of the light emitting elements, and insulators 109, which function as partitions, are formed on the second substrate 107. It is preferable that the second substrate 107 also be heated under a reduced pressure. Then, the first substrate 101 and the second substrate 107 are aligned and face each other with a short distance therebetween.

Figure 1C:
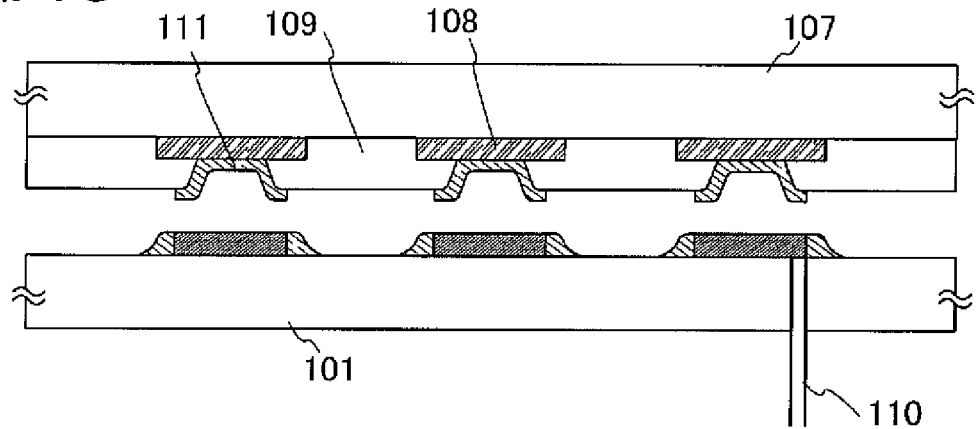

Next, as shown in FIG. 1C, light 110 is applied from a rear face (a face on which neither the light absorption layers 102 nor the material layers 103 are formed) of the first substrate 101 under a reduced pressure. At this time, light onto part of the material layers 103 (portions located outside end portions of the light absorption layers) passes through the material layers 103, whereas light onto the light absorption layers 102 formed on the first substrate 101 is absorbed. The light absorption layers 102 convert the absorbed light into heat and feed the heat to the material included in the material layers 103 in regions in contact with the light absorption layers 102, whereby films of at least part of the material included in the material layers 103 are formed on the first electrodes 108 on the second substrate 107. Thus, EL layers 111 of the light emitting elements are formed on the second substrate 107.

The laser light with a repetition rate of greater than or equal to 10 MHz and a pulse width of 100 fs to 10 ns inclusive, which is used in this embodiment mode, makes it possible to perform laser light irradiation in a short time; thus, heat diffusion can be suppressed and films with a minute pattern can be formed. In addition, the laser light with a repetition rate of greater than or equal to 10 MHz and a pulse width of 100 fs to 10 ns inclusive, which can be output with high power, makes it possible to treat a large area at one time and to shorten the time it takes to form the films. Therefore, the productivity can be improved.

This embodiment mode presents a case where the first electrodes 108 are formed on the second substrate 107, which is the deposition target substrate, and the films are formed on the first electrodes 108; however, the present invention can also be applied to a case where part of the EL layers has already been formed on the first electrodes 108. For example, with the use of the second substrate 107 on which part of the EL layers (e.g., hole injecting layers or hole transporting layers) has been formed on the first electrodes 108, light emitting layers can be formed with application of the film formation method of the present invention. When a full-color light emitting device is manufactured, it is necessary to form light emitting layers selectively; the film formation method of the present invention makes it possible to selectively form light emitting layers with ease. Further, the light emitting layers can be selectively formed with accuracy.

Furthermore, the evaporation donor substrate according to the present invention can be formed easily because it is formed by providing the light absorption layers and the material layers. In addition, the evaporation donor substrate can be manufactured at low cost because the structure is simple.

The material layers and the evaporation donor substrate are in contact with the light absorption layers; thus, diffusion of heat from the light absorption layers in a planar direction can be suppressed when the evaporation donor substrate is irradiated with the light. Consequently, blurs (to form a film in an undesired pattern) can be suppressed. In particular, with a material having a low thermal conductivity used for the evaporation donor substrate, blurs of the pattern of the films can further be suppressed. The "planar direction" means a direction which is orthogonal to the thickness direction, and means a parallel direction to a face of a substrate.

Further, in this embodiment mode, part of the material remains on the first substrate 101 after the laser light irradiation, as shown in FIG. 1C. A procedure for reusing the first substrate 101 on which part of the material remains is described below.

Figure 2A:
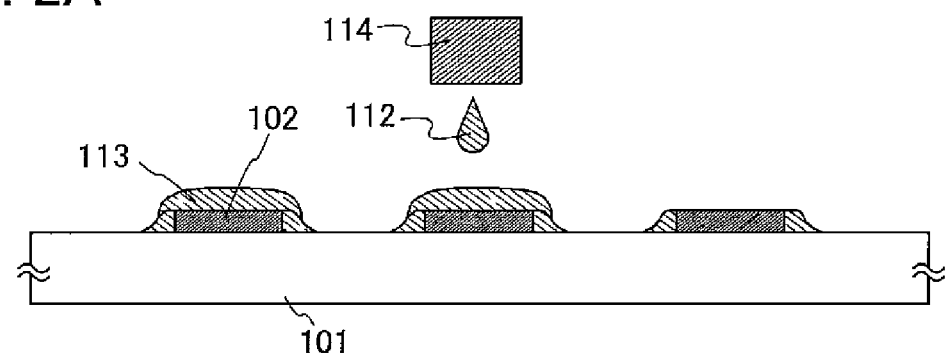
FIGS. 2A to 2C are cross-sectional views showing a method for forming films.

In order to form films on another deposition target substrate, droplets 112 are selectively discharged again out of the nozzle 114 of the droplet discharge apparatus onto the first substrate 101 on which part of the material remains. Then, material layers 113 are formed on the light absorption layers 102 as shown in FIG. 2A.

Figure 2B:
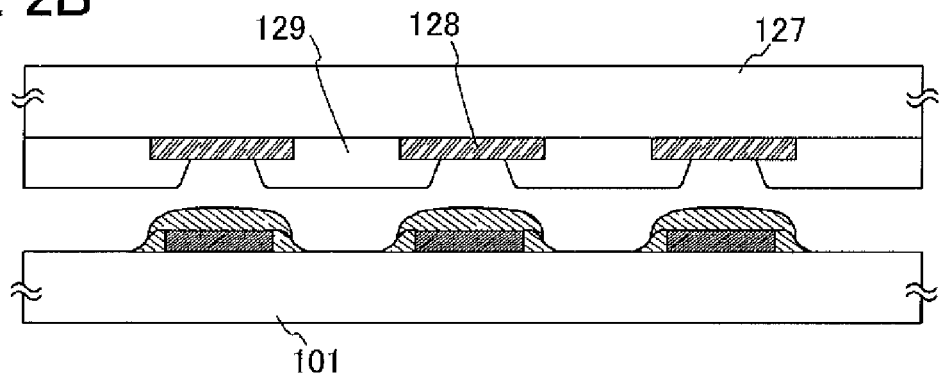

Next, the first substrate 101 provided with the material layers 113 and a deposition target substrate 127 are aligned to face each other As shown in FIG. 2B, the deposition target substrate 127 is also provided with first electrodes 128, which function as electrodes of light emitting elements, and insulators 129, which function as partitions.

Figure 2C:
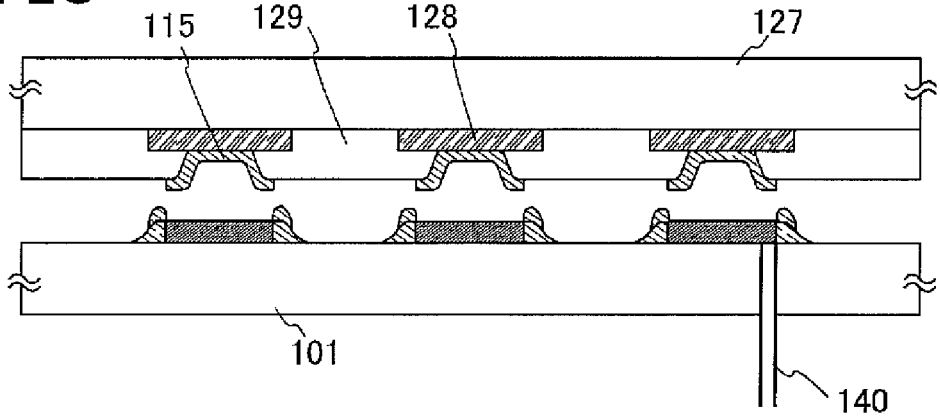

Then, as shown in FIG. 2C, light 140 is applied from the rear face (a face on which neither the light absorption layers 102 nor the material layers 113 are formed) of the first substrate 101 under a reduced pressure. Thus, EL layers 115 of the light emitting elements are formed on the deposition target substrate 127. The light 140 is laser light. After the laser light irradiation, part of the material remains on the first substrate 101 as shown in FIG. 2C. Even if part of the material remains on the first substrate 101 as described above, it has little influence on film formation; therefore, the first substrate 101 can be repeatedly used as an evaporation donor substrate without removing the part of the material remaining on the first substrate 101. The first substrate is transferred repeatedly through at least a treatment chamber for laser light irradiation, a treatment chamber for droplet discharge, and a treatment chamber for drying or baking a material layer. Thus, cost of manufacturing a light emitting device can be reduced.

Needless to say, it is also possible to remove the remaining material layers from the evaporation donor substrate which has already been used for film formation and to form new material layers again, thereby using the evaporation donor substrate plural times. In such a case, although it takes time to perform cleaning treatment for removing the remaining material, cost of manufacturing a light emitting device can be reduced by using a plurality of evaporation donor substrates and cleaning a plurality of evaporation donor substrates at a time.

According to the present invention, a glass substrate or a quartz substrate is used as the evaporation donor substrate. Impurities (e.g., moisture) are less apt to be adsorbed or attached on these substrates than on a film substrate or the like. Therefore, the evaporation donor substrate according to the present invention is suitable for reuse.

Further, in the present invention, the films are formed with a short distance between the evaporation donor substrate and the deposition target substrate, whereby a large part of the material layers provided on the evaporation donor substrate forms films on the deposition target substrate; therefore, use efficiency of the material is high. Thus, manufacturing cost can be reduced. Further, in addition to forming the films with a short distance between the evaporation donor substrate and the deposition target substrate, the material to evaporate is minimized by heating only part of the material layers 103, which prevents the material from attaching on an inner wall of a deposition chamber and makes it easy to perform maintenance of a deposition apparatus.

(Embodiment Mode 2)

This embodiment mode describes a case where a red-light emitting layer, a green-light emitting layer, and a blue-light emitting layer are formed selectively with some space therebetween in order to manufacture a full-color light emitting device, with reference to FIGS. 4A to 4C and FIGS. 5A to 5C.

First, in order to form material layers for forming hole injecting layers later, droplets 142 are selectively discharged out of a nozzle 144 of a droplet discharge apparatus, so that material layers 133 including a substance with a high hole transporting property and a substance with an electron accepting property are formed on a first substrate 131. The first substrate 131 is provided with light absorption layers 132 so as to have opening portions 136 in advance. Since this embodiment mode presents an example in which the hole injecting layers are provided for red-light emitting elements, blue-light emitting elements, and green-light emitting elements, the same number of light absorption layers 132 as that of pixels, i.e., as that of the light emitting elements, are provided. Further, the top forms of the light absorption layers 132 are designed as appropriate by a practitioner so that the light absorption layers 132 can have a desired pattern of the hole injecting layers that are formed later because the top forms of the light absorption layers 132 reflect the pattern of the hole injecting layers.

Figure 4A:
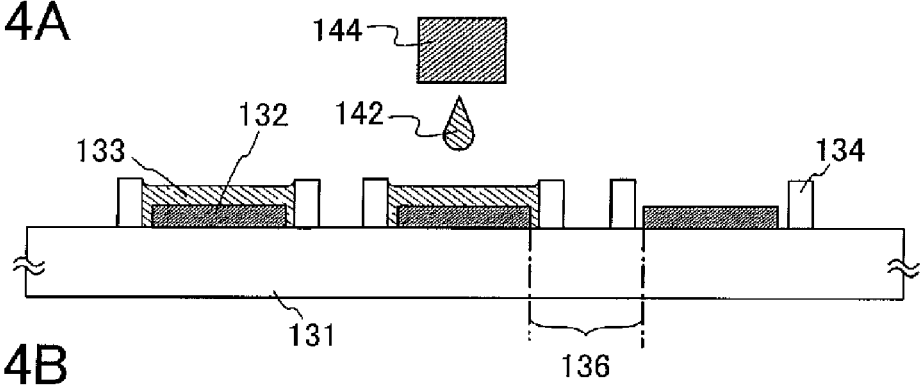
FIGS. 4A to 4C are cross-sectional views showing steps of manufacturing a light emitting device.

Furthermore, in this embodiment mode, first partitions 134 for controlling the amount of liquid that is discharged out of a droplet discharge apparatus onto the first substrate 131 are provided for the first substrate 131, as shown in FIG. 4A. For the first partitions 134, an inorganic material or an organic material is used. Further, it is preferable to have space between the first partitions 134 and the light absorption layers 132 in order to prevent heat conduction, and to form the first partitions using a material that withstands laser light irradiation, and transmits the laser light. The first partitions 134 have frame-like forms when seen from the above, and make it possible to hold a liquid in regions surrounded by the first partitions 134. The same number of the first partitions 134 as that of the pixels, i.e., as that of the light emitting elements, are provided. The first partitions 134 make it possible to precisely control the volumes of space surrounded by the whole first partitions 134 with the height of the first partitions 134; thus, droplets are dripped in the regions surrounded by the first partitions 134, and the amount of liquid held in the regions surrounded by the first partitions 134 can be controlled.

As in Embodiment Mode 1, a substrate with a high light transmittance, such as a glass substrate or a quartz substrate, is used as the first substrate 131. Further, as in Embodiment Mode 1, a material with a low reflectance and a high absorptance with respect to irradiation light is used for the light absorption layers 132.

After completing the droplet discharge in the regions surrounded by the first partitions 134, drying or baking for forming the material layers 133 on the first substrate 131 is performed. After that, it is preferable to perform heating under a reduced pressure in order to remove moisture on the first substrate.

Figure 4B:
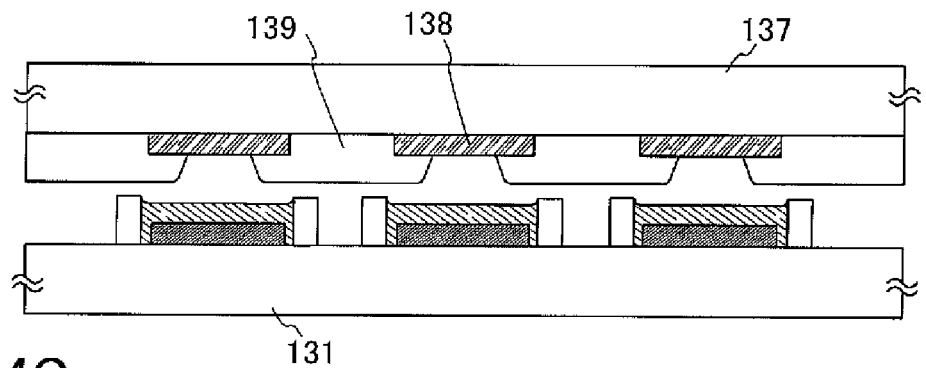

Next, as shown in FIG. 4B, a second substrate 137, which is a deposition target substrate, is placed so as to face a surface on which the light absorption layers 132 and the material layers 133 are formed. First electrodes 138, which function as electrodes of the light emitting elements, and insulators 139, which function as partitions, are formed on the second substrate 137. It is preferable that the second substrate 137 also be heated under a reduced pressure. Then, the first substrate 131 and the second substrate 137 are aligned and face each other with a short distance therebetween.

Figure 4C:
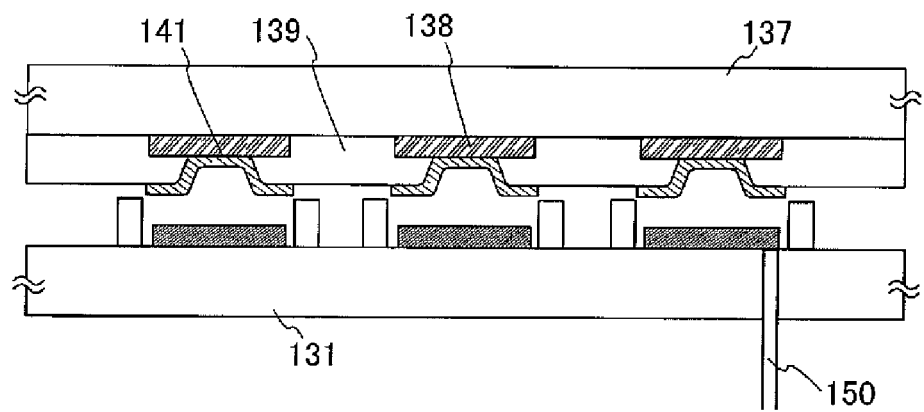

Next, as shown in FIG. 4C, light 150 is applied from a rear face (a face on which neither the light absorption layers 132 nor the material layers 133 are formed) of the first substrate 131 under a reduced pressure. At this time, light onto the material layers 133 and onto the first partitions 134 passes therethrough while light onto the light absorption layers 132 formed on the first substrate 131 is absorbed. The light absorption layers 132 convert the absorbed light into heat and feed the heat to the material included in the material layers 133 in regions in contact with the light absorption layers 132, whereby films of at least part of the material included in the material layers 133 are formed on the first electrodes 138 on the second substrate 137. Through the above process, hole injecting layers 141 of the light emitting elements are formed on the second substrate 137.

Here, as in Embodiment Mode 1, laser light with a wavelength of 532 nm, a repetition rate of greater than or equal to 10 MHz, and a pulse width of 100 fs to 10 ns inclusive is used as the light 150.

Although FIG. 4C shows an example in which part of the material layers 133 located between the light absorption layers 132 and the first partitions 134 is also heated and evaporated, there is no particular limitation.

Next, in order to form material layers for forming hole transporting layers later, droplets are selectively discharged out of a nozzle of a droplet discharge apparatus to form material layers including a substance with a high hole transporting property on a third substrate. The third substrate is provided with light absorption layers in advance. Since this embodiment mode presents an example in which the hole transporting layers are provided for the red-light emitting elements, the blue-light emitting elements, and the green-light emitting elements, the same number of light absorption layers as that of the pixels, i.e., as that of the light emitting elements, are provided. Thus, the hole transporting layers can be formed in a similar manner to the hole injecting layers, and simple description is made here.

Next, the second substrate 137, which is the deposition target substrate, is placed so as to face a surface on which the light absorption layers and the material layers are formed.

Subsequently, laser light is applied from a rear face (a face on which neither the light absorption layers nor the material layers are formed) of the third substrate under a reduced pressure. Through the above process, hole transporting layers 145 of the light emitting elements are formed on the second substrate 137.

Then, in order to form material layers for forming red-light emitting layers later, droplets are selectively discharged out of a nozzle of a droplet discharge apparatus to form material layers 605 including a red-light emitting material on a fourth substrate 154. The fourth substrate 154 is provided with light absorption layers 604 and second partitions 601 in advance. Since this embodiment mode presents an example in which the red-light emitting layers are provided only for the red-light emitting elements, the same number of light absorption layers as that of red pixels, i.e., as that of the red-light emitting elements, are provided. The accuracy of film formation position which is required for the light emitting layers is different from that of the hole injecting layers and the hole transporting layers, which are provided for each pixel; thus, it is preferable to prevent the light emitting layers from spreading out on adjacent pixel regions of different light emitting colors in forming the light emitting layers. Therefore, it is preferable to form the light emitting layers with a short distance between the substrates. The second partitions 601 partly overlap with the light absorption layers 604, and regions surrounded by the second partitions 601 are smaller than the regions surrounded by the first partitions.

Figure 5A:
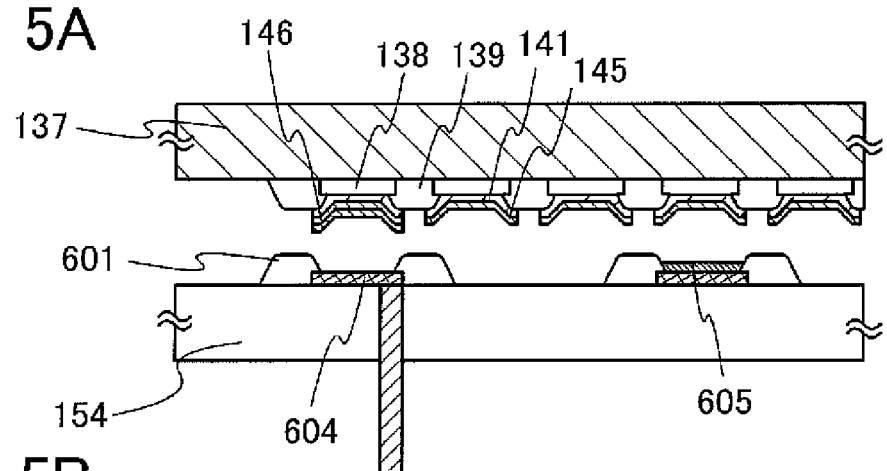
FIGS. 5A to 5C are cross-sectional views showing steps of manufacturing a light emitting device.

FIG. 5A is a cross-sectional view when the second substrate 137 and the fourth substrate 154 are aligned to face each other, and third laser scanning is performed with a given distance between the second substrate 137 and the fourth substrate 154. As shown in FIG. 5A, the material layers 605 are partly heated with the laser light irradiation, so that red-light emitting layers 146 are selectively formed to overlap with the hole transporting layers 145.

Figure 5B:
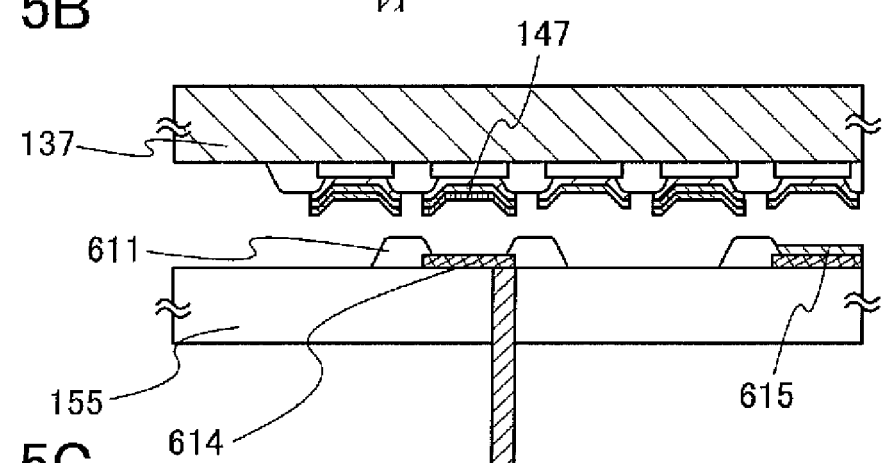

The fourth substrate 154 which has been scanned with the laser light is moved. Next, the second substrate 137 and a fifth substrate 155 are aligned to face each other. In advance, the fifth substrate 155 is provided with light absorption layers 614 and third partitions 611, and material layers 615 including a green-light emitting material are formed in regions surrounded by the third partitions 611 with a droplet discharge apparatus. FIG. 5B is a cross-sectional view when fourth laser scanning is performed with a given distance between the substrates. As shown in FIG. 5B, the material layers 615 are heated partly with the laser light irradiation, so that green-light emitting layers 147 are selectively formed to overlap with the hole transporting layers 145.

Figure 5C:
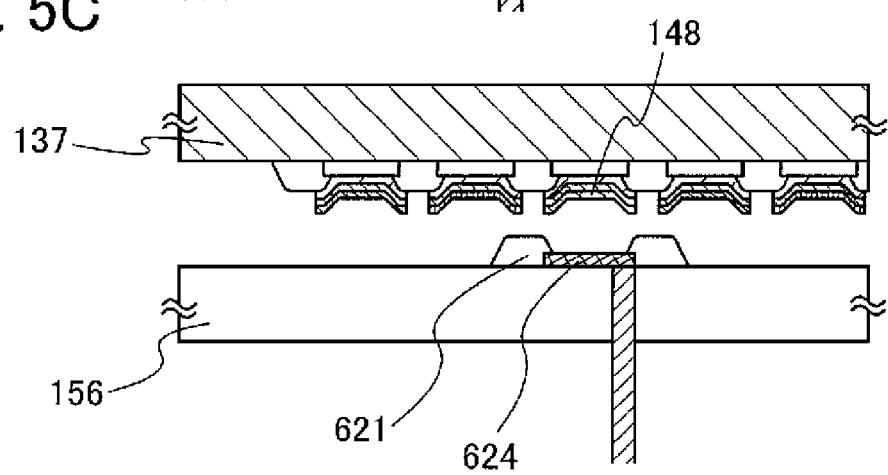

The fifth substrate 155 which has been scanned with the laser light is moved. Then, the second substrate 137 and a sixth substrate 156 are aligned to face each other. In advance, the sixth substrate 156 is provided with light absorption layers 624 and fourth partitions 621, and material layers including a blue-light emitting material are formed in regions surrounded by the fourth partitions 621 with a droplet discharge apparatus. FIG. SC is a cross-sectional view when fifth laser scanning is performed with a given distance between the substrates. As shown in FIG. 5C, the material layers including the blue-light emitting material are heated partly with the laser light irradiation, so that blue-light emitting layers 148 are selectively formed to overlap with the hole transporting layers 145.

Through the above procedure, the red-light emitting layers, the green-light emitting layers, and the blue-light emitting layers can be selectively formed with some space therebetween.

Although this embodiment mode shows the hole injecting layers and the hole transporting layers with almost the same thickness, there is no particular limitation. The thickness of the hole injecting layers and/or the hole transporting layers may vary according to an emission color, which makes it possible to provide a light emitting device in which light of each color can be extracted efficiently In the present invention, a droplet discharge apparatus is used; thus, the amount of liquid dripped in a region surrounded by a partition can be changed in every pixels of a different emission color.

After forming the light emitting layers, electron transporting layers are formed on the light emitting layers. Further, electron injecting layers are formed thereon. Lastly, second electrodes are formed. The second electrodes are formed by a sputtering method, an electron beam method, or the like. Through the above process, light emitting diodes having at least the first electrodes, the second electrodes, and the light emitting layers therebetween are manufactured on the second substrate 137.

Further, the electron transporting layers and the electron injecting layers can also be formed through a similar process to the hole injecting layers and the hole transporting layers. In such a case, a seventh substrate for forming the electron transporting layers and an eighth substrate for forming the electron injecting layers are prepared. Furthermore, the thickness of the electron transporting layers and/or the electron injecting layers may vary according to an emission color, which makes it possible to provide a light emitting device in which light of each color can be extracted efficiently.

Although an example is presented here in which an EL layer in which five layers, i.e., the hole injecting layer, the hole transporting layer, the light emitting layer, the electron transporting layer, and the electron injecting layer are stacked is provided between the first electrode and the second electrode, there is no particular limitation. As the EL layer, a hole transporting layer, a light emitting layer, and an electron transporting layer may be stacked, and a practitioner can design the structure as appropriate with a light emitting material, emission efficiency, and the like taken in mind.

Further, in manufacturing a light emitting device which can perform full color display and is presented in this embodiment mode, the present invention makes it possible to reduce waste of a desired material and to form films on a deposition target substrate. Thus, use efficiency of the material is improved and manufacturing cost can be reduced.

Furthermore, in the present invention, the thickness of films formed on a deposition target substrate can be controlled by controlling the thickness of material layers formed on an evaporation donor substrate with a droplet discharge apparatus or the partitions; therefore, a thickness monitor is not necessary in forming the films on the deposition target substrate. Therefore, a user does not have to adjust the deposition rate with the use of a thickness monitor, and the deposition process can be fully automated. Accordingly, productivity can be increased.

Figure 6A:
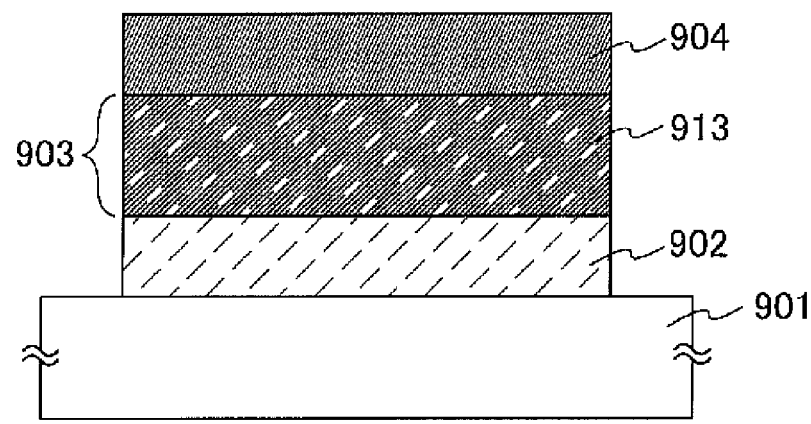
FIGS. 6A and 6B are cross-sectional views showing light emitting elements.
Figure 6B:
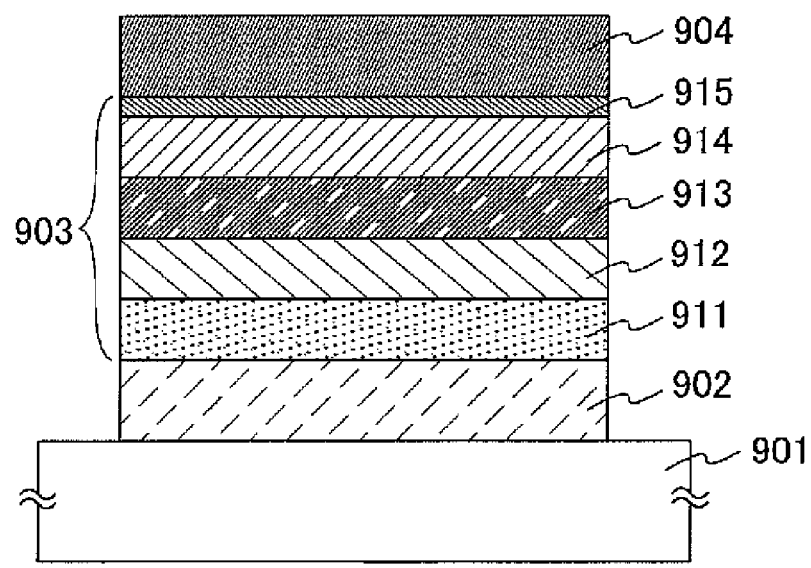

FIGS. 6A and 6B show examples of a stacked-layer structure of a light emitting element obtained in the above manner.

In a light emitting element shown in FIG. 6A, a first electrode 902, an EL layer 903 consisting only of a light emitting layer 913, and a second electrode 904 are stacked in this order on a substrate 901. One of the first electrode 902 and the second electrode 904 functions as an anode, and the other functions as a cathode. Holes injected from the anode and electrons injected from the cathode are recombined in the EL layer 903, whereby light can be emitted. In this embodiment mode, the first electrode 902 functions as the anode and the second electrode 904 functions as the cathode.

In a light emitting element shown in FIG. 6B, a plurality of layers are stacked as the EL layer 903 in FIG. 6A. Specifically, a hole injecting layer 911, a hole transporting layer 912, a light emitting layer 913, an electron transporting layer 914, and an electron injecting layer 915 are provided in this order on the first electrode 902. The EL layer 903 functions when it has at least the light emitting layer 913 as shown in FIG. 6A; therefore, it is not necessary to provide all these layers of the EL layer 903, and the layers may be provided as appropriate if needed.

The substrate 901 shown in FIGS. 6A and 6B corresponds to the second substrate 137 in FIGS. 4A to 4C and FIGS. 5A to 5C.

For the first electrode 902 and the second electrode 904, any of various types of metals, alloys, electrically conductive compounds, mixtures thereof, and the like can be used. Examples thereof include indium tin oxide (ITO), indium tin oxide including silicon or silicon oxide, indium zinc oxide (IZO), indium oxide including tungsten oxide and zinc oxide, and the like. As other examples, gold (Au), platinum (Pt), nickel (Ni), tungsten (W), chromium (Cr), molybdenum (Mo), iron (Fe), cobalt (Co), copper (Cu), palladium (Pd), nitride of a metal material (e.g., titanium nitride), and the like can be given.

Films of these materials are generally formed by a sputtering method. For example, a film of indium zinc oxide can be formed by a sputtering method using a target which includes 1 wt % to 20 wt % zinc oxide with respect to indium oxide. A film of indium oxide including tungsten oxide and zinc oxide can be formed by a sputtering method using a target which includes 0.5 wt % to 5 wt % tungsten oxide and 0.1 wt % to 1 wt % zinc oxide with respect to indium oxide. Alternatively, by application of a sol-gel method or the like, they may be formed by an inkjet method, a spin coating method, or the like.

Further alternatively, aluminum (Al), silver (Ag), an alloy including aluminum, or the like can be used. Still further alternatively, any of the following materials having a low work function can be used: elements which belong to Group 1 and Group 2 of the periodic table, that is, alkali metals such as lithium (Li) and cesium (Cs); alkaline-earth metals such as magnesium (Mg), calcium (Ca), and strontium (Sr); alloys thereof (e.g., an alloy of aluminum, magnesium, and silver, and an alloy of aluminum and lithium); rare-earth metals such as europium (Eu) and ytterbium (Yb); alloys thereof, and the like.

Films of alkali metals, alkaline-earth metals, and alloys thereof can be formed by a vacuum evaporation method. Alternatively, films of alloys including an alkali metal or an alkaline-earth metal can be formed by a sputtering method. Further alternatively, the first electrode 902 and the second electrode 904 can also be formed using a silver paste or the like by an inkjet method or the like. Further, each of the first electrode 902 and the second electrode 904 is not limited to a single layer and can be formed with stacked layers.

In order to extract light emitted from the EL layer 903 to the outside, one or both of the first electrode 902 and the second electrode 904 is/are formed so as to transmit light. For example, one or both of the first electrode 902 and the second electrode 904 is/are formed using a conductive material having a light-transmitting property, such as indium tin oxide, or formed using silver, aluminum, or the like to a thickness of several nanometers to several tens of nanometers. Alternatively, one or both of the first electrode 902 and the second electrode 904 can have a stacked-layer structure including a thin film of a metal such as silver or aluminum and a thin film of a conductive material having a light-transmitting property, such as ITO.

The EL layer 903 (the hole injecting layer 911, the hole transporting layer 912, the light emitting layer 913, the electron transporting layer 914, and the electron injecting layer 915) of the light emitting element presented in this embodiment mode can be formed by forming the material layer on the evaporation donor substrate with a droplet discharge apparatus and employing a film formation method of laser irradiation.

For example, when the light emitting element shown in FIG. 6A is formed, a solution including a material for forming the EL layer 903 is prepared; the material layer is formed on the evaporation donor substrate with a droplet discharge apparatus; and the EL layer 903 is formed on the first electrode 902 on the substrate 901. Then, the second electrode 904 is formed on the EL layer 903, so that the light emitting element shown in FIG. 6A can be obtained.

A variety of materials can be used for the light emitting layer 913. For example, a fluorescent compound, which exhibits fluorescence, or a phosphorescent compound, which exhibits phosphorescence, can be used.

Examples of phosphorescent compounds that can be used for the light emitting layer 913 are given below. Examples of blue-light emitting materials include bis[2-(4',6'-difluorophenyl)pyridinato-N,$C^{2'}$]iridium(III) tetrakis(1-pyrazolyl)borate (abbr.: FIr6); bis[2-(4',6'-difluorophenyl)pyridinato-N,$C^{2'}$]iridium(III) picolinate (abbr.: FIrpic); bis [2-(3',5'bistrifluoromethylphenyl)pyridinato-N,$C^{2'}$]iridium(III) picolinate (abbr.: Ir($CF_3$ppy)$_2$(pic)); bis[2-(4',6'-difluorophenyl)pyridinato-N,$C^{2'}$]iridium(III) acetylacetonate (abbr.: FIracac); and the like. Examples of green-light emitting materials include tris(2-phenylpyridinato-N,$C^{2'}$)iridium(III)

(abbr.: Ir(ppy)$_3$); bis(2-phenylpyridinato-N,C$^{2'}$)iridium(III) acetylacetonate (abbr.: Ir(Ppy)$_2$(acac)); bis(1,2-diphenyl-1H-benzimidazolato)iridium(III) acetylacetonate (abbr.: Ir(pbi)$_2$(acac)); bis(benzo[h]quinolinato)iridium(III) acetylacetonate (abbr.: Ir(bzq)$_2$(acac)); and the like. Examples of yellow-light emitting materials include bis(2,4-diphenyl-1,3-oxazolato-N,C$^{2'}$)iridium(III) acetylacetonate (abbr.: Ir(dpo)$_2$(acac)); bis[2-(4'-perfluorophenylphenyl)pyridinato]indium (III) acetylacetonate (abbr.: Ir(p-PF-ph)$_2$(acac)); bis(2-phenylbenzothiazolato-N,C$^{2'}$)iridium(III) acetylacetonate (abbr.: Ir(bt)$_2$(acac)); and the like. Examples of orange-light emitting materials include tris(2-phenylquinolinato-N,C$^{2'}$)iridium(III) (abbr.: Ir(pq)$_3$); bis(2-phenylquinolinato-N,C$^{2'}$)iridium(III) acetylacetonate (abbr.: Ir(pq)$_2$(acac)); and the like. Examples of red-light emitting materials include organic metal complexes such as bis[2-(2'-benzo[4,5-α]thienyl)pyridinato-N,C$^{3'}$]iridium(III) acetylacetonate (abbr.: Ir(btp)$_2$(acac)); bis(1-phenylisoquinolinato-N,C$^{2'}$)iridium(III) acetylacetonate (abbr.: Ir(piq)$_2$(acac)); (acetylacetonato)bis[2,3-bis(4-fluorophenyl)quinoxalinato]iridium(III) (abbr.: Ir(Fdpq)2(acac)); and 2,3,7,8,12,13,17,18-octaethyl-21H,23H-porphyrin platinum(II) (abbr.: PtOEP). Further, a rare-earth metal complex such as tris(acetylacetonato)(monophenanthroline)terbium(III) (abbr.: Tb(acac)$_3$(Phen)), tris(1,3-diphenyl-1,3-propanedionato)(monophenanthroline)europium(III) (abbr.: Eu(DBM)$_3$(Phen)), or tris[1-(2-thenoyl)-3,3,3-trifluoroacetonato](monophenanthroline)europium(III) (abbr: Eu(TTA)$_3$(Phen)) exhibits light emission from rare-earth metal ions (electron transition between different multiplicities); thus, a rare-earth metal complex can be used as the phosphorescent compound.

Examples of fluorescent compounds that can be used for the light emitting layer 913 are given below. Examples of blue-light emitting materials include N,N'-bis[4-(9H-carbazol-9-yl)phenyl]-N,N'-diphenylstilbene-4,4'-diamine (abbr.: YGA2S); 4-(9H-carbazol-9-yl)-4'-(10-phenyl-9-anthryl) triphenylamine (abbr.: YGAPA); and the like. Examples of green-light emitting materials include N-(9,10-diphenyl-2-anthryl)-N,9-diphenyl-9H-carbazol-3-amine (abbr.: 2PCAPA); N-[9,10-bis(1,1'-biphenyl-2-yl)-2-anthryl]-N,9-diphenyl-9H-carbazol-3-amine (abbr.: 2PCABPhA); N-(9,10-diphenyl-2-anthryl)-N,N',N'-triphenyl-1,4-phenylenediamine (abbr.: 2DPAPA); N-[9,10-bis(1,1'-biphenyl-2-yl)-2-anthryl]-N,N',N'-triphenyl-1,4-phenylenediamine (abbr.: 2DPABPhA); 9,10-bis(1,1'-biphenyl-2-yl)-N-[4-(9H-carbazol-9-yl)phenyl]-N-phenylanthracen-2-amine (abbr.: 2YGABPhA); N,N,9-triphenylanthracen-9-amine (abbr.: DPhAPhA); and the like. Examples of yellow-light emitting materials include rubrene; 5,12-bis(1,1'-biphenyl-4-yl)-6,11-diphenyltetracene (abbr.: BPT); and the like. Examples of red-light emitting materials include N,N,N',N'-tetrakis(4-methylphenyl)tetracene-5,11-diamine (abbr.: p-mPhTD); 7,13-diphenyl-N,N,N',N'-tetrakis(4-methylphenyl)acenaphtho[1,2-a]fluoranthene-3,10-diamine (abbr: p-mPhAFD); and the like.

In the light emitting layer 913, a substance having a high light emitting property (a dopant material) may be dispersed in another substance (a host material), whereby crystallization of the light emitting layer can be suppressed. In addition, concentration quenching which results from a high concentration of the substance having a high light emitting property can be suppressed.

As the substance in which the substance having a high light emitting property is dispersed, when the substance having a high light emitting property is a fluorescent compound, it is preferable to use a substance having higher singlet excitation energy (the energy difference between a ground state and a singlet excited state) than the fluorescent compound. When the substance having a high light emitting property is a phosphorescent compound, it is preferable to use a substance having higher triplet excitation energy (the energy difference between a ground state and a triplet excited state) than the phosphorescent compound.

Examples of host materials that are used for the light emitting layer 913 include bis(2-methyl-8-quinolinolato)(4-phenylphenolato)aluminum(III) (abbr.: BAlq); N,N'-bis(3-methylphenyl)-N,N'-diphenyl-[1,1'-biphenyl]-4,4'-diamine (abbr.: TPD); 9-[4-(10-phenyl-9-anthryl)phenyl]-9H-carbazole (abbr.: CZPA); and the like.

As the dopant material, any of the above phosphorescent compounds and fluorescent compounds can be used.

When a substance having a high light emitting property (a dopant material) is dispersed in another substance (a host material) in the light emitting layer 913, a mixed layer of a host material and a guest material is formed as the material layer on the evaporation donor substrate. Alternatively, a layer including a host material and a layer including a dopant material may be stacked in the material layer on the evaporation donor substrate. When the light emitting layer 913 is formed using the evaporation donor substrate provided with the material layer having such a structure, the light emitting layer 913 includes a substance for dispersing a light emitting material (host material) therein and a substance having a high light emitting property (dopant material); the substance having a high light emitting property (dopant material) is dispersed in the substance for dispersing the light emitting material (host material) therein. For the light emitting layer 913, two or more kinds of host materials and a dopant material may be used, or two or more kinds of dopant materials and a host material may be used. Alternatively, two or more kinds of host materials and two or more kinds of dopant materials may be used.

When the light emitting element shown in FIG. 6B is formed, an evaporation donor substrate provided with a material layer formed using a material for forming a layer in the EL layer 903 (the hole injecting layer 911, the hole transporting layer 912, the light emitting layer 913, the electron transporting layer 914, and the electron injecting layer 915) is prepared for each layer, and with a different evaporation donor substrate used for forming each layer, laser light irradiation is performed to form the EL layer 903 on the first electrode 902 on the substrate 901. Then, the second electrode 904 is formed on the EL layer 903, so that the light emitting element shown in FIG. 6B can be obtained.

For example, the hole injecting layer 911 can be formed using molybdenum oxide, vanadium oxide, ruthenium oxide, tungsten oxide, manganese oxide, or the like. Alternatively, the hole injecting layer 911 can be formed using a phthalocyanine-based compound such as phthalocyanine (abbr.: H$_2$Pc) or copper phthalocyanine (abbr.: CuPe), or the like.

As the hole injecting layer 911, a layer which includes a substance having a high hole transporting property and a substance having an electron accepting property can be used. The layer which includes a substance having a high hole transporting property and a substance having an electron accepting property has a high carrier density and an excellent hole injecting property. When the layer which includes a substance having a high hole transporting property and a substance having an electron accepting property is used as a hole injecting layer in contact with an electrode functioning as an anode, any of various kinds of metals, alloys, electrically conductive compounds, mixtures thereof, and the like can be used for the electrode regardless of a work function of a material of the electrode functioning as the anode.

The layer which includes a substance having a high hole transporting property and a substance having an electron accepting property can be formed using an evaporation donor substrate provided with a material layer in which a layer which includes the substance having a high hole transporting property and a layer which includes the substance having an electron accepting property are stacked, for example.

Examples of the substance having an electron accepting property which is used for the hole injecting layer 911 include 7,7,8,8-tetracyano-2,3,5,6-tetrafluoroquinodimethane (abbr.: F4-TCNQ); chloranil; and the like. As another example, transition metal oxide can be given. Further, as another example, oxide of metal belonging to any of Groups 4 to 8 of the periodic table can be given. Specifically, vanadium oxide, niobium oxide, tantalum oxide, chromium oxide, molybdenum oxide, tungsten oxide, manganese oxide, and rhenium oxide are preferable because of their high electron accepting properties. Among them, molybdenum oxide is especially preferable because it is stable also in the atmosphere, has a low hygroscopic property, and can be handled easily.

As the substance having a high hole transporting property which is used for the hole injecting layer 911, any of various compounds such as aromatic amine compounds, carbazole derivatives, and aromatic hydrocarbon can be used. It is preferable that the substance having a high hole transporting property which is used for the hole injecting layer have a hole mobility of greater than or equal to $10^{-6}$ cm$^2$/Vs. However, any other substance that has a hole transporting property which is higher than an electron transporting property may also be used. Specific examples of the substance having a high hole transporting property which can be used for the hole injecting layer 911 are given below.

Examples of aromatic amine compounds that can be used for the hole injecting layer 911 include 4,4'-bis[N-(1-naphthyl)-N-phenylamino]biphenyl (abbr.: NPB); N,N'-bis(3-methylphenyl)-N,N'-diphenyl-[1,1'-biphenyl]-4,4'-diamine (abbr.: TPD); 4,4',4''-tris(N,N-diphenylamino)triphenylamine (abbr.: TDATA); 4,4',4''-tris[N-(3-methylphenyl)-N-phenylamino]triphenylamine (abbr.: MTDATA); 4,4'-bis[N-(spiro-9,9'-bifluoren-2-yl)-N-phenylamino]biphenyl (abbr.: BSPB); and the like. As other examples, N,N-bis(4-methylphenyl)(p-tolyl)-N,N'-diphenyl-p-phenylenediamine (abbr.: DTDPPA); 4,4'-bis[N-(4-diphenylaminophenyl)-N-phenylamino]biphenyl (abbr.: DPAB); 4,4'-bis(N-{4-[N'-(3-methylphenyl)-N'-phenylamino]phenyl}-N-phenylamino) biphenyl (abbr.: DNTPD); 1,3,5-tris[N-(4-diphenylaminophenyl)-N-phenylamino]benzene (abbr.: DPA3B); and the like can be given.

Specifically, examples of carbazole derivatives that can be used for the hole injecting layer 911 include 3-[N-(9-phenylcarbazol-3-yl)-N-phenylamino]-9-phenylcarbazole (abbr.: PCzPCA1); 3,6-bis[N-(9-phenylcarbazol-3-yl)-N-phenylamino]-9-phenylcarbazole (abbr.: PCzPCA2); 3-[N-(1-naphthyl)-N-(9-phenylcarbazol-3-yl)amino]-9-phenylcarbazole (abbr.: PCzPCN1); and the like.

As other examples of carbazole derivatives that can be used for the hole injecting layer 911, 4,4'-di(N-carbazolyl)biphenyl (abbr: CBP); 1,3,5-tris[4-(N-carbazolyl)phenyl]benzene (abbr.: TCPB); 9-[4-(10-phenyl-9-anthryl)phenyl]-9H-carbazole (abbr.: CzPA); 1,4-bis[4-(N-carbazolyl)phenyl]-2,3,5,6-tetraphenylbenzene; and the like can be given.

Examples of aromatic hydrocarbon that can be used for the hole injecting layer 911 include 2-tert-butyl-9,10-di(2-naphthyl)anthracene (abbr.: t-BuDNA); 2-tert-butyl-9,10-di(1-naphthyl)anthracene; 9,10-bis(3,5-diphenylphenyl)anthracene (abbr.: DPPA); 2-tert-butyl-9,10-bis(4-phenylphenyl)anthracene (abbr.: t-BuDBA); 9,10-di(2-naphthyl)anthracene (abbr.: DNA); 9,10-diphenylanthracene (abbr.: DPAnth); 2-tert-butylanthracene (abbr.: t-BuAnth); 9,10-bis(4-methyl-1-naphthyl)anthracene (abbr.: DMNA); 9,10-bis[2-(1-naphthyl)phenyl]-2-tert-butyl-anthracene; 9,10-bis[2-(1-naphthyl)phenyl]anthracene; 2,3,6,7-tetramethyl-9,10-di(1-naphthyl)anthracene; 2,3,6,7-tetramethyl-9,10-di(2-naphthyl)anthracene; 9,9'-bianthryl; 10,10'-diphenyl-9,9'-bianthryl; 10,10'-bis(2-phenylphenyl)-9,9'-bianthryl; 10,10'-bis[(2,3,4,5,6-pentaphenyl)phenyl]-9,9'-bianthryl; anthracene; tetracene; rubrene; perylene; 2,5,8,11-tetra(tert-butyl)perylene; and the like. Alternatively, pentacene, coronene, or the like can also be used. As the aromatic hydrocarbon listed here, it is preferable to use aromatic hydrocarbon having a hole mobility of greater than or equal to $1 \times 10^{-6}$ cm$^2$/Vs and having 14 to 42 carbon atoms.

Aromatic hydrocarbon that can be used for the hole injecting layer 911 may have a vinyl skeleton. Examples of aromatic hydrocarbon having a vinyl group include 4,4'-bis(2,2-diphenylvinyl)biphenyl (abbr.: DPVBi); 9,10-bis[4-(2,2-diphenylvinyl)phenyl]anthracene (abbr.: DPVPA); and the like.

The hole injecting layer 911 can be formed with the use of the evaporation donor substrate provided with the material layer in which the layer which includes the substance having a high hole transporting property and the layer which includes the substance having an electron accepting property are stacked. When metal oxide is used as the substance having an electron accepting property, it is preferable to form a layer which includes metal oxide after forming the layer which includes a substance having a high hole transporting property on an evaporation donor substrate because metal oxide has a higher evaporation temperature than the substance having a high hole transporting property in many cases. The evaporation donor substrate provided with such a stacked-layer structure makes it possible to form a film of the substance having a high hole transporting property and the metal oxide efficiently. In addition, local non-uniformity of the concentration in the film formed can be suppressed. For example, the layer which includes the substance having a high hole transporting property is formed with a droplet discharge apparatus and then the layer including the metal oxide is formed thereon by an evaporation method to prepare an evaporation donor substrate, and the evaporation donor substrate is irradiated with laser light, whereby a mixed layer including the substance having a high hole transporting property and the metal oxide can be formed easily on a deposition target substrate. There are only a few kinds of solvents which allow both a substance having a high hole transporting property and metal oxide to be dissolved or dispersed therein, and it is difficult to prepare a solvent including both the substance having a high hole transporting property and the metal oxide. Therefore, direct film formation by a conventional wet method has been difficult.

The layer which includes a substance having a high hole transporting property and a substance having an electron accepting property is excellent not only in a hole injecting property but also in a hole transporting property; thus, the above hole injecting layer 911 may be used as the hole transporting layer.

The hole transporting layer 912 includes a substance having a high hole transporting property. Examples of the substance having a high hole transporting property include aromatic amine compounds such as 4,4'-bis[N-(1-naphthyl)-N-phenylamino]biphenyl (abbr.: NPB or α-NPD), N,N'-bis(3-methylphenyl)-N,N'-diphenyl-[1,1'-biphenyl]-4,4'-diamine (abbr.: TPD), 4,4',4''-tris(N,N-diphenylamino)triphenylamine (abbr.: TDATA), 4,4',4''-tris[N-(3-methylphenyl)-N-phenylamino]triphenylamine (abbr.: MTDATA), and 4,4'-bis

[N-(spiro-9,9'-bifluoren-2-yl)-N-phenylamino]biphenyl (abbr.: BSPB), and the like. The substances listed here mainly have a hole mobility of greater than or equal to $10^{-6}$ cm$^2$/Vs. However, any other substance that has a hole transporting property which is higher than an electron transporting property may also be used. The layer which includes a substance having a high hole transporting property is not limited to a single layer, and may be stacked layers of two or more layers formed using the above substances.

The electron transporting layer 914 includes a substance having a high electron transporting property. Examples of the substance having a high electron transporting property include metal complexes having a quinoline skeleton or a benzoquinoline skeleton, such as tris(8-quinolinolato)aluminum (abbr.: Alq), tris(4-methyl-8-quinolinolato)aluminum (abbr.: Almq$_3$), bis(10-hydroxybenzo[h]quinolinato)beryllium (abbr.: BeBq$_2$), and bis(2-methyl-8-quinolinolato)(4-phenylphenolato)aluminum (abbr.: BAlq), and the like. As other examples, metal complexes having an oxazole-based ligand or a thiazole-based ligand, such as bis[2-(2-hydroxyphenyl)benzoxazolato]zinc (abbr.: Zn(BOX)$_2$) and bis[2-(2-hydroxyphenyl)benzothiazolato]zinc (abbr.: Zn(BTZ)$_2$), and the like can be given. As other examples, besides metal complexes, 2-(4-biphenylyl)-5-(4-tert-butylphenyl)-1,3,4-oxadiazole (abbr.: PBD); 1,3-bis[5-(p-tert-butylphenyl)-1,3,4-oxadiazol-2-yl]benzene (abbr.: OXD-7); 3-(4-biphenylyl)-4-phenyl-5-(4-tert-butylphenyl)-1,2,4-triazole (abbr.: TAZ01); bathophenanthroline (abbr.: BPhen); bathocuproine (abbr.: BCP); and the like can be given. The substances listed here mainly have an electron mobility of greater than or equal to $10^{-6}$ cm$^2$/Vs. However, any other material that has an electron transporting property which is higher than a hole transporting property may also be used for the electron transporting layer. The electron transporting layer is not limited to a single layer, and may be stacked layers of two or more layers formed using the above substances.

The electron injecting layer 915 can be formed using an alkali metal compound or an alkaline-earth metal compound, such as lithium fluoride (LiF), cesium fluoride (CsF), or calcium fluoride (CaF$_2$). Alternatively, a layer including a substance having an electron transporting property and an alkali metal or an alkaline-earth metal can be employed. For example, a layer of Alq including magnesium (Mg) can be used. It is preferable to use the layer including a substance having an electron transporting property and an alkali metal or an alkaline-earth metal as the electron injecting layer, which allows electrons to be injected from the second electrode 904 efficiently.

There is no particular limitation on a stacked-layer structure of the EL layer 903. The EL layer 903 may be formed by an appropriate combination of a light emitting layer with any of a layer which includes a substance having a high electron transporting property, a layer which includes a substance having a high hole transporting property, a layer which includes a substance having a high electron injecting property, a layer which includes a substance having a high hole injecting property, a layer which includes a bipolar substance (a substance having high electron and hole transporting properties), and the like.

Light emitted from the EL layer 903 is extracted to the outside through one or both of the first electrode 902 and the second electrode 904. Therefore, one or both of the first electrode 902 and the second electrode 904 have a light transmitting property. In a case where only the first electrode 902 has a light transmitting property, light is extracted from the substrate 901 side through the first electrode 902. In a case where only the second electrode 904 has a light transmitting property, light is extracted from the side opposite to the substrate 901 through the second electrode 904. In a case where both the first electrode 902 and the second electrode 904 have a light transmitting property, light is extracted from both the substrate 901 side and the side opposite to the substrate 901 through the first electrode 902 and the second electrode 904.

Although FIGS. 6A and 6B show the structures in which the first electrode 902 functioning as an anode is provided on the substrate 901 side, the second electrode 904 functioning as a cathode may be provided on the substrate 901 side.

The EL layer 903 can be formed by the film formation method described in Embodiment Mode 1, or may be formed by a combination of the film formation method described in Embodiment Mode 1 with another film formation method. The layers may each be formed by a different method. For example, as a dry method which can be combined, a vacuum evaporation method, an electron beam evaporation method, a sputtering method, or the like can be given. Further, as a wet method which can be combined, a spin coating method, a spray coating method, an inkjet method, a dip coating method, a casting method, a die coating method, a roll coating method, a blade coating method, a bar coating method, a gravure coating method, a printing method, or the like can be given.

Although this embodiment mode presents an example of a full-color light emitting device in which the light emitting layers of three colors, i.e., red-light emitting layers, green-light emitting layers, and blue-light emitting layers, are used, there is no particular limitation. For example, white-light emitting layers may further be provided, or the light emitting device may have light emitting layers of four or more colors.

This embodiment mode can be freely combined with Embodiment Mode 1.

(Embodiment Mode 3)

Figure 7A:
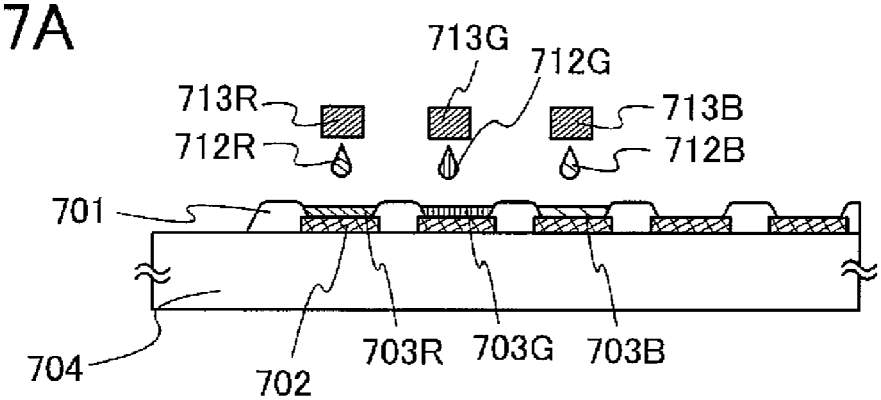
FIGS. 7A to 7C are cross-sectional views showing steps of manufacturing a light emitting device.
Figure 7B:
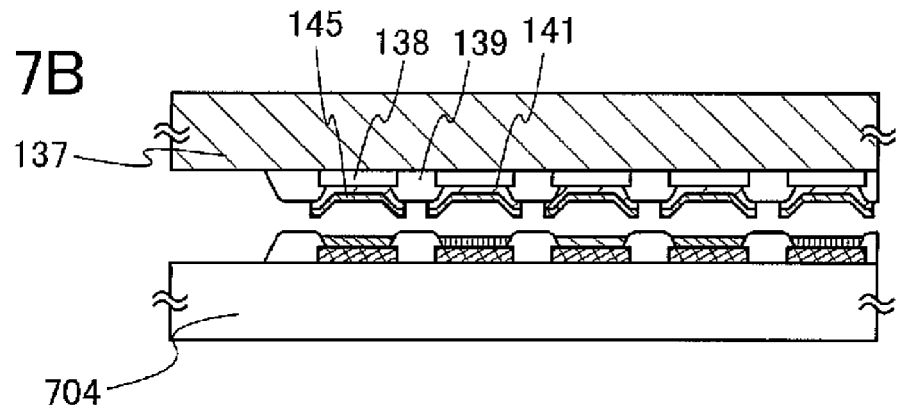
Figure 7C:
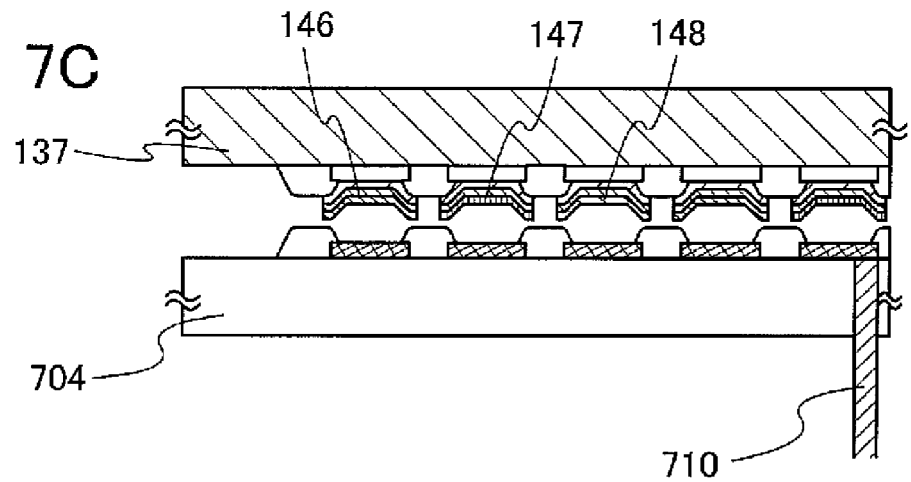

This embodiment mode describes a method in which the number of evaporation donor substrates used is reduced, with reference to FIGS. 7A to 7C.

Embodiment Mode 2 describes an example of using three evaporation donor substrates for a red color, a green color, and a blue color, whereas this embodiment mode describes an example of using a droplet discharge apparatus which has a plurality of heads and can discharge different materials from nozzles of the heads, with reference to FIGS. 7A to 7C.

Since the method in this embodiment mode is different from that in Embodiment Mode 2 only in manufacturing an evaporation donor substrate, the same parts are designated with the same reference numerals and are described briefly.

In a similar manner to Embodiment Mode 2, a first substrate, which is an evaporation donor substrate for forming hole injecting layers 141, and a third substrate, which is an evaporation donor substrate for forming hole transporting layers 145, are prepared and are aligned successively with a second substrate 137 to face each other. Then, laser light scanning is performed to form films on the second substrate 137.

As shown in FIG. 7A, light absorption layers 702 and partitions 701 are provided for a fourth substrate 704, and droplets are dripped so as to overlap with the light absorption layers 702 with the use of a droplet discharge apparatus.

When substrates with the same size are used for the fourth substrate 704 and the second substrate 137, and the light absorption layers 702 are formed using the same photomask as that for first electrodes 138, and the partitions 701 are formed using the same photomask as that for insulators 139, alignment can be performed accurately. Thus, accuracy of film formation position can be improved and cost of manufacturing photomasks can be reduced.

The droplet discharge apparatus has three heads. Droplets are discharged out of nozzles, i.e., a first nozzle 713R, a second nozzle 713G, and a third nozzle 713B of the heads. First droplets 712R for forming red-light emitting layers are discharged out of the first nozzle 713R. Second droplets 712G for forming green-light emitting layers are discharged out of the second nozzle 713G. Third droplets 712B for forming blue-light emitting layers are discharge out of the third nozzle 713B. First material layers 703R, second material layers 703G, and third material layers 703B are formed in their respective regions surrounded by the partitions 701.

After discharging the droplets, heat treatment for drying or baking is performed if necessary.

Next, as shown in FIG. 7B, the second substrate 137, which is a deposition target substrate, is arranged so as to face a surface of the fourth substrate 704 which is provided with the light absorption layers 702, the first material layers 703R, the second material layers 703G, and the third material layers 703B. Then, the fourth substrate 704 and the second substrate 137 are aligned and face each other with a short distance therebetween.

Next, as shown in FIG. 7C, laser light 710 is applied from a rear face of the fourth substrate 704 (a face on which neither the light absorption layers 702, the first material layers 703R, the second material layers 703G, nor the third material layers 703B are formed) under a reduced pressure. At this time, light onto the light absorption layers 702 formed on the fourth substrate 704 is absorbed. The light absorption layers 702 convert the absorbed light into heat and feed the heat to the first material layers 703R, the second material layers 703G and the third material layers 703B in regions in contact with the light absorption layers 702, whereby films are formed to overlap with the first electrodes 138 formed on the second substrate 107. Through one-time laser light scanning, red-light emitting layers 146, green-light emitting layers 147, and blue-light emitting layers 148 of light emitting elements are formed on the second substrate 137.

Since steps thereafter are the same as those described in Embodiment Mode 2, detailed description thereof is omitted here. Embodiment Mode 2 presents an example in which seven evaporation donor substrates are used, whereas in this embodiment mode, two evaporation donor substrates can be saved; thus, the number of evaporation donor substrates can be reduced to five.

Needless to say, as in Embodiment Mode 2, the EL layers can be formed by the film formation method described in Embodiment Mode 1 or 2, or may be formed by a combination of the film formation method described in Embodiment Mode 1 or 2 with another film formation method. The layers may each be formed by a different method. For example, as a dry method which can be combined, a vacuum evaporation method, an electron beam evaporation method, a sputtering method, or the like can be given. Further, as a wet method which can be combined, a spin coating method, a spray coating method, an inkjet method, a dip coating method, a casting method, a die coating method, a roll coating method, a blade coating method, a bar coating method, a gravure coating method, a printing method, or the like can be given.

Embodiments below describe the present invention having the above structure in more detail.

[Embodiment 1]

This embodiment describes an example of manufacturing a light emitting device with a fully automatic manufacturing apparatus.

Figure 8:
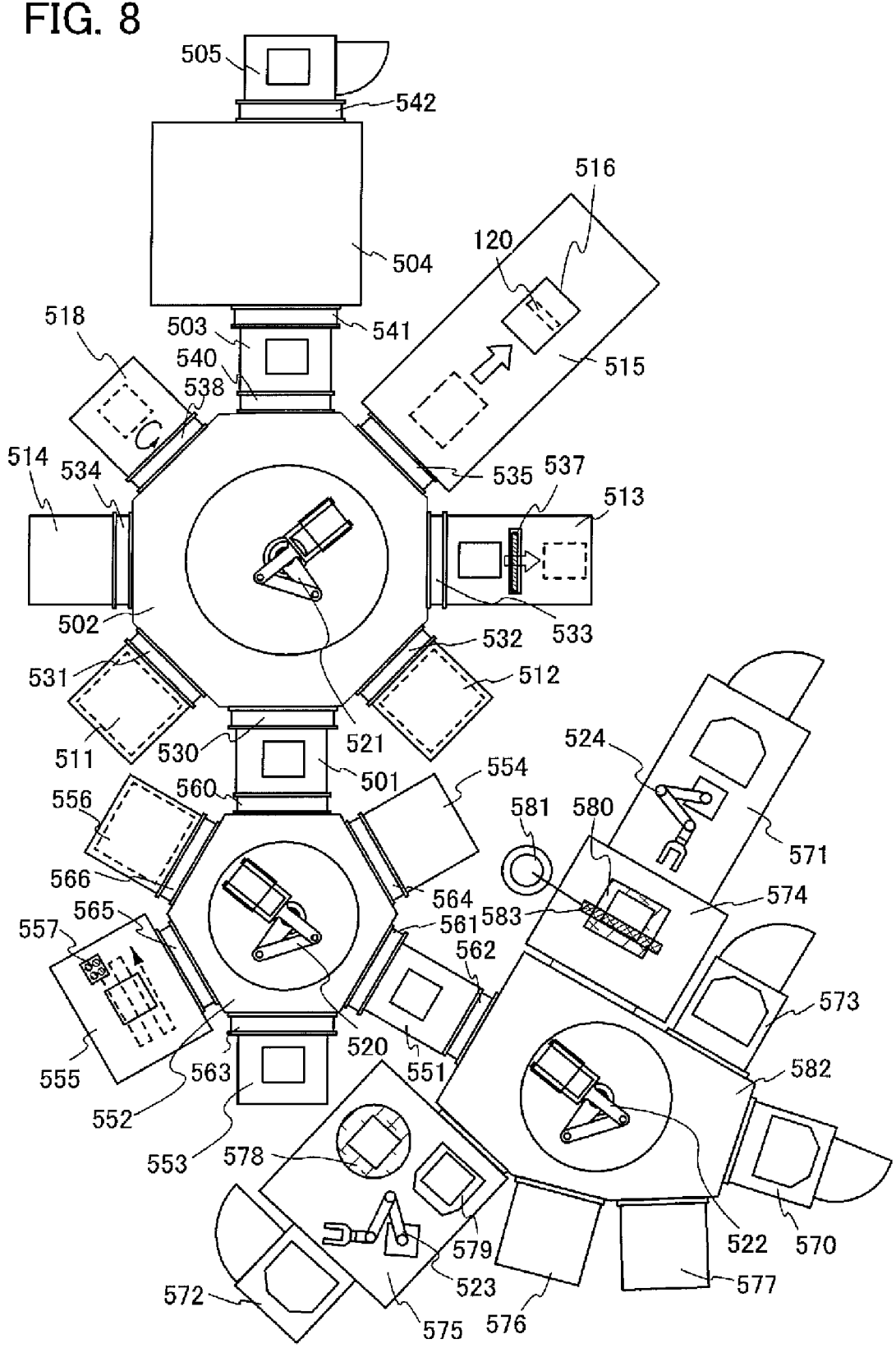
FIG. 8 is a top view of an example of a manufacturing apparatus.

FIG. 8 shows a top view of an example of the manufacturing apparatus.

The manufacturing apparatus shown in FIG. 8 includes a first transfer chamber 582 and a second transfer chamber 552, which are connected to each other through a first delivery chamber 551. Further, the manufacturing apparatus includes a third transfer chamber 502, which is connected to the second transfer chamber 552 through a second delivery chamber 501. Furthermore, the manufacturing apparatus includes a sealing chamber 504, which is connected to the third transfer chamber 502 through a third delivery chamber 503.

The second transfer chamber 552, the third transfer chamber 502, and the sealing chamber 504 can each be connected to a vacuum evacuation treatment chamber and evacuated to a vacuum so that moisture and the like cannot enter the chamber, and after vacuum evacuation, insides thereof can also be placed in atmospheric pressure by introducing an inert gas. For the vacuum evacuation treatment chamber, a magnetic levitation turbo molecular pump, a cryopump, or a dry pump is used. With such a pump, the ultimate vacuum in the transfer chambers connected to other chambers can be set to be from $10^{-3}$ Pa to $10^{-6}$ Pa, and reverse diffusion of impurities from the pump side and from an exhaust system can be controlled.

First, a first substrate 101, which is an evaporation donor substrate, is placed in a first cassette chamber 571, a second cassette chamber 572, or a third cassette chamber 573. One chamber is selected from the three cassette chambers according to a film which is formed on the evaporation donor substrate. Note that light absorption layers 102 are formed selectively in advance on the first substrate 101 by a photolithography technique or the like.

In a case where material layers are formed selectively on the first substrate 101 with a droplet discharge apparatus as described in Embodiment Mode 1, the first substrate 101 is set in a face-up mode in the first cassette chamber 571, and is transferred to a treatment chamber 574 having a droplet discharge apparatus with the use of a transfer unit 524 provided for the first cassette chamber 571, and droplets are discharged. The transfer unit 524 can turn a substrate upside down, and the substrate can be transferred upside down into the treatment chamber 574; therefore, the first substrate 101 may be set in a face-down mode in the first cassette chamber 571 in order to prevent dust from attaching on the light absorption layers on the first substrate 101.

The treatment chamber 574 is provided with a droplet discharge unit 583 having a head with a plurality of nozzles arranged in an axial direction, a control portion that controls the droplet discharge unit 583, a stage 580 that fixes a substrate and moves in X, Y, and θ directions, an ink bottle 581 that supplies the droplet discharge unit 583 with a composition, and the like.

The first substrate on which the droplets have been dripped is transferred to a bake chamber 576 using a transfer unit 522 of the first transfer chamber 582 connected to the treatment chamber 574, and drying or baking is performed. A plurality of substrates can be heated in the bake chamber 576, which can also function as a stock chamber for stocking the first substrate.

In a case where a material layer is formed on an entire face of the first substrate 101 by a spin coating method, a spray method, or the like with a coating apparatus, the first substrate 101 is set in a face-up mode in the second cassette chamber 572, and is transferred to a treatment chamber 575 having a coating apparatus with the use of a transfer unit 523 provided for the treatment chamber 575, and coating is performed. The transfer unit 523 can also turn a substrate upside down, and the substrate can be placed upside down onto a stage 578; therefore, the first substrate 101 may be set in a face-down mode in the second cassette chamber 572 in order to prevent dust from attaching on the light absorption layers on the first substrate 101.

The treatment chamber 575 is provided with a nozzle that drips a material liquid, the stage 578 that fixes a substrate and rotates, a control portion that controls the number of rotation of the stage, a stage 579 on which a substrate coated with the material liquid is placed, a tank that supplies the nozzle with the material liquid, and the like.

The first substrate which has undergone coating is transferred to the bake chamber 576 using the transfer unit 522 of the first transfer chamber 582 connected to the treatment chamber 575, and drying or baking is performed.

In a case where a material layer is formed on the first substrate by a resistance heating method, the first substrate 101 is set in a face-down mode in the third cassette chamber 573, and is transferred to the first delivery chamber 551 with the use of the transfer unit 522 of the first transfer chamber 582 connected to the third cassette chamber 573. Further, the first substrate 101 is transferred to a pretreatment chamber 553 using a transfer unit 520 provided for the second transfer chamber 552 connected to the first delivery chamber 551, and in order to remove moisture or gases from the substrate with great thoroughness, annealing for degasification is performed in a vacuum (less than or equal to 0.665 Pa ($5\times10^{-3}$ Torr), preferably from $10^{-4}$ Pa to $10^{-6}$ Pa). Then, the first substrate 101 is transferred to a treatment chamber 555 using the transfer unit 520, and evaporation is performed by a resistance heating method.

The treatment chamber 555 is provided with a means for moving an evaporation source 557 along a path designated by a dotted line in the chamber, a means for fixing a substrate, a thickness monitor, a vacuum evacuation treatment chamber, and the like. A plurality of crucibles are provided for the evaporation source 557, and evaporation materials in the crucibles are heated by a resistance heating method. In the treatment chamber 555, the evaporation source is moved under the substrate set in a face-down mode, thereby performing evaporation. In a case where films are formed selectively with an evaporation mask, an evaporation mask stocked in a treatment chamber 554 is transferred to the treatment chamber 555, and the evaporation mask is aligned with the substrate, and evaporation is performed.

The first substrate 101 that is set in the first cassette chamber 571, the second cassette chamber 572, or the third cassette chamber 573 and is provided with a material layer as appropriated in the treatment chamber is transferred to the third transfer chamber 502, and is further transferred to a laser light irradiation chamber 515 using a transfer unit 521 provided for the third transfer chamber 502, with a surface provided with the material layer up, i.e., in a face-up mode. In a case where the material layer on the first substrate is formed by an evaporation method, the surface provided with the material layer faces down when the material layer has been formed; therefore, in such a case, the substrate is turned upside down with a substrate turning mechanism provided for a treatment chamber 518, and then is transferred to the laser light irradiation chamber 515.

The treatment chamber 518 may be used not only for turning a substrate upside down but also for stocking a plurality of substrates. If the transfer unit 521 can turn a substrate upside down, it is not necessary to provide the substrate turning mechanism for the treatment chamber 518, and the treatment chamber 518 can be used for stocking a plurality of substrates.

Further, a second substrate, which functions as a deposition target substrate, is set in a face-down mode in a fourth cassette chamber 570, and is transferred to the first delivery chamber 551 using the transfer unit 522 of the first transfer chamber 582 connected to the fourth cassette chamber 570. Furthermore, the second substrate is transferred to the pretreatment chamber 553 using the transfer unit 520 provided for the second transfer chamber 552 connected to the first delivery chamber 551, and in order to remove moisture or gases from the second substrate with great thoroughness, annealing for degasification is performed in a vacuum. In particular, in a case where a TFT is formed on the second substrate, if an organic resin film is used for an interlayer insulating film or a partition, some organic resin materials adsorb moisture easily and degasification can be caused; thus, it is effective to perform vacuum heating in which adsorbed moisture is removed by heating the second substrate at 100° C. to 250° C., preferably at 150° C. to 200° C. for 30 minutes or more, for example, and cooling down the second substrate naturally for 30 minutes before forming a layer including an organic compound.

If a passive matrix light emitting device is manufactured, at least first electrodes in a stripe form are formed on the second substrate in advance. If an active matrix light emitting device is manufactured, first electrodes and switching elements that are electrically connected to the first electrodes, such as thin film transistors in which an amorphous semiconductor film, a polycrystalline semiconductor film, a microcrystalline semiconductor film, or a single crystal semiconductor film functions as an active layer, are formed on the second substrate in advance.

After that, the second substrate, which functions as the deposition target substrate, is transferred to the second delivery chamber 501 using the transfer unit 520, and is further transferred to the laser light irradiation chamber 515 using the transfer unit 521 provided for the third transfer chamber 502 connected to the second delivery chamber 501, with a surface provided with the first electrodes down, i.e., in a face-down mode.

The laser light irradiation chamber 515 has a window 120 for introducing laser light emitted from a laser light source into the laser light irradiation chamber, at a bottom portion.

After transferring the first substrate into the laser light irradiation chamber 515, the first substrate is aligned with the second substrate, which functions as the deposition target substrate, to face each other, and a distance d between the substrates is kept in a given value with a pair of substrate holding units 516. Then, the pair of substrates are irradiated with laser light, and a laser light irradiation region is moved relatively to be scanned with the laser light.

Figure 9:
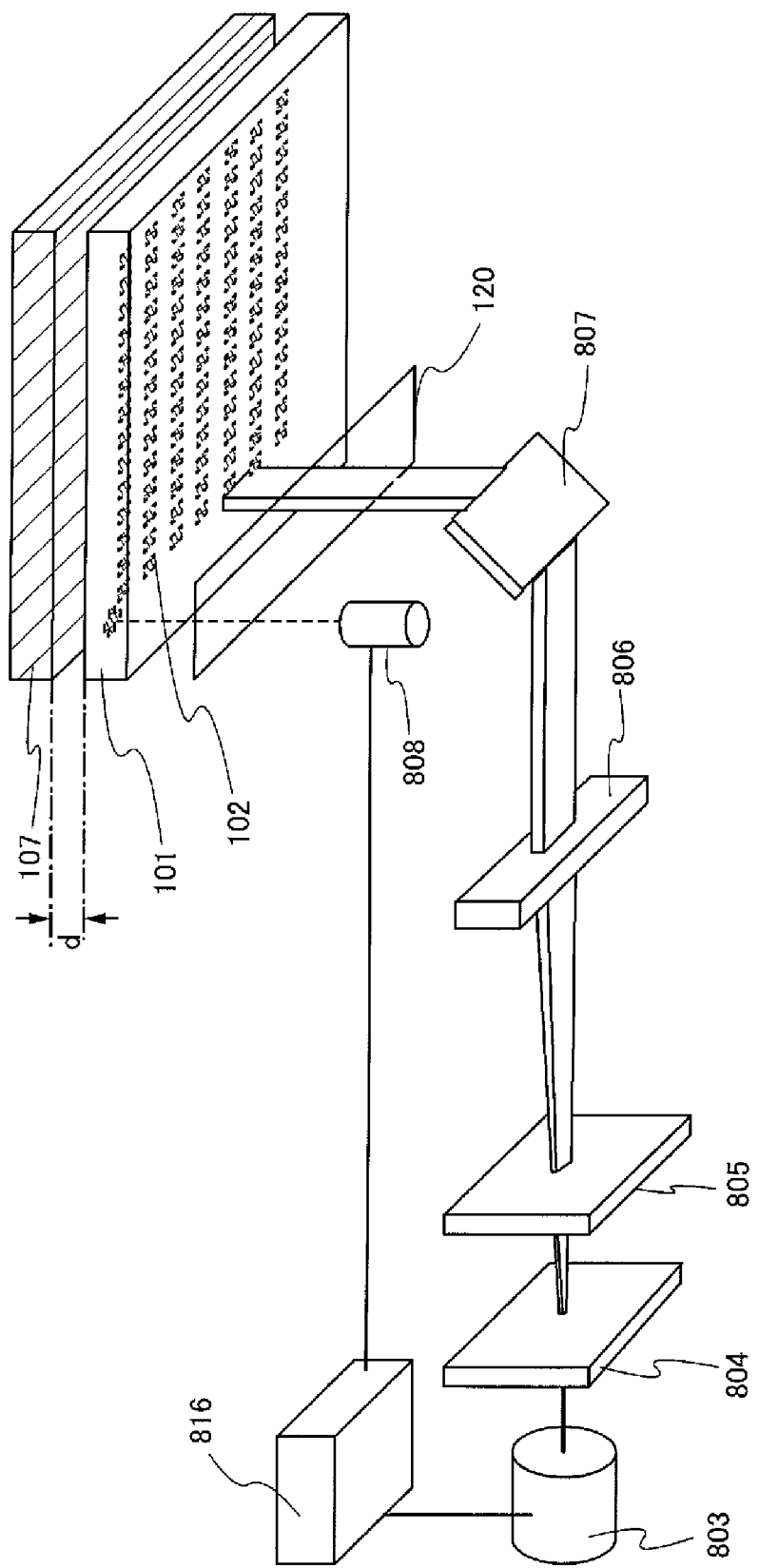
FIG. 9 is a perspective view when laser light irradiation is performed.

FIG. 9 is a schematic diagram showing a positional relation between the window 120 and a laser device 803 in forming films.

A laser beam emitted is output from the laser device 803, passes through a first optical system 804 for changing a beam form into a rectangular shape, a second optical system 805 for shaping a beam, and a third optical system 806 for collimating a beam, and turns in a direction perpendicular to the first substrate 101 at a reflecting mirror 807. Then, the laser beam passes through the window 120 for introducing light and through the first substrate 101, so that the light absorption layers 102 are irradiated with the laser light. The window may have a same or smaller size as/than a width of the laser beam, whereby the window 120 can function as a slit.

The laser device 803 emits laser light with a repetition rate of greater than or equal to 10 MHz and a pulse width of 100 fs to 10 ns inclusive. With the laser light with a repetition rate of 10 MHz and a pulse width of 100 fs to 10 ns inclusive, laser light irradiation can be performed in a short time; thus, heat diffusion can be suppressed, and films having almost the same sizes as those of regions of the material layers which overlap with the light absorption layers 102 before the laser light irradiation can be formed on the second substrate after the laser light irradiation, thereby preventing formation of a thin film around a film formation pattern and formation of a larger pattern than what a practitioner desires. If the thin film is formed around the film formation pattern, an outline of the film formation pattern blurs; the laser light with a pulse width of 100 fs to 10 ns inclusive can relieve the blur of the outline. There is no particular limitation on the wavelength of laser light, and laser light with a variety of wavelengths can be employed. For example, laser light with a wavelength of 355 nm, 515 nm, 532 nm, 1030 nm, 1064 nm, or the like can be employed.

It is preferable that a control device 816 control the pair of substrate holding units 516 that move the pair of substrates. Further, it is preferable that the control device 816 work with a position alignment mechanism having an image pickup element 808 for determining a position marker.

When the laser light scanning is completed, the regions of the material layers which overlap with the light absorption layers 102 have disappeared and films have been formed selectively on the second substrate 107 that faces the first substrate 101.

If remaining material layers are removed from the first substrate 101 which has undergone laser light scanning, the first substrate 101 can be used again. The first substrate 101 which has undergone laser light scanning is transferred to a cleaning chamber 577, and the remaining material layers are removed.

Through the above procedure, the material layers with a single-layer structure can be formed selectively on the second substrate 107. If material layers with a stacked-layer structure are formed, a third substrate is prepared in advance; the first substrate 101 which has undergone laser light scanning is replaced with the third substrate; the third substrate is aligned with the second substrate 107 to face each other in the laser light irradiation chamber 515; and the distance between the substrates is kept in a given value with the pair of substrate holding units 516. After that, the pair of substrates are irradiated with laser light, and second laser light scanning is further performed with a laser light irradiation region moved relatively.

The third substrate is provided with light absorption layers. In a similar manner to the first substrate, the third substrate is set in the first cassette chamber 571, the second cassette chamber 572, or the third cassette chamber 573, and second material layers are formed as appropriate in the treatment chamber.

If a plurality of layers are stacked in the laser light irradiation chamber 515, a fourth substrate is taken into the laser light irradiation chamber 515 without taking the second substrate out of the laser irradiation chamber 515; the second substrate is aligned with the fourth substrate to face each other, and are irradiated with laser light; and third laser scanning is performed with a laser light irradiation region moved relatively. Through a similar procedure, four or more layers can be stacked.

In a case where films are formed with the use of the laser light irradiation chamber 515, material layers are formed on the first substrate, the third substrate, the fourth substrate, and the like and the substrates are stocked in the treatment chamber 518 in advance before taking the second substrate into the laser light irradiation chamber 515; after taking the second substrate into the laser light irradiation chamber 515, the evaporation donor substrates are changed successively and layers are stacked, whereby the steps can proceed efficiently. In the film formation method in which material layers which are formed in advance on a different substrate from a deposition target substrate are heated with laser light, the amount of the material which is necessary for forming films is suppressed and the amount of the material evaporated is reduced compared to that in a conventional resistance heating method; thus, a plurality of transfer robots, alignment units, substrate move units, or the like can be provided for the laser light irradiation chamber 515 for forming a film. Further, the film formation method in which material layers which are formed in advance on a different substrate from a deposition target substrate are heated with laser light can prevent different light emitting materials from mixing even if different light emitting layers are formed in the same treatment chamber (in the laser light irradiation chamber 515).

When five or more layers are formed as an EL layer constituting a light emitting element, it is possible to form all the layers of the EL layer with the use of the laser light irradiation chamber 515; at least one layer is formed with the use of the laser light irradiation chamber 515.

For example, after stacking hole injecting layers and hole transporting layers on first electrodes with the use of the laser light irradiation chamber 515, red-light emitting layers and green-light emitting layers can be formed selectively and blue-light emitting layers may be formed in a treatment chamber 512 by a resistance heating method in which a substrate is rotated. If blue-light emitting layers are formed selectively, an evaporation mask stocked in the treatment chamber 554 is transferred to the treatment chamber 512 and is aligned with the second substrate, and evaporation is performed. An evaporation source, a substrate rotating unit, a means for alignment with an evaporation mask, a thickness monitor, and the like are provided for the treatment chamber 512.

In a case where electron transporting layers or electron injecting layers are formed by a resistance heating method, they can be formed in a treatment chamber 513. A means for moving the second substrate in a direction designated by an arrow over an evaporation source 537 in the chamber, a thickness monitor, a vacuum evacuation treatment chamber, and the like are provided for the treatment chamber 513. The evaporation source 537 has a long line form, and an evaporation material is heated by a resistance heating method. If films are formed selectively, an evaporation mask stocked in the treatment chamber 554 is transferred to the treatment chamber 513, and is aligned with the second substrate; then, evaporation is performed with the second substrate and the evaporation mask moved.

In a case where hole injecting layers or hole transporting layers are formed by a resistance heating method, they can be formed in the treatment chamber 555.

In a case where red-light emitting layers are formed by a resistance heating method, they can be formed in a treatment chamber 511. In a case where green-light emitting layers are formed by a resistance heating method, they can be formed in a treatment chamber 556. An evaporation source, a substrate rotating unit, a thickness monitor, a means for alignment with an evaporation mask, a vacuum evacuation treatment chamber, and the like are provided for each of the treatment chambers 511 and 556. Although this embodiment presents an example in which light emitting layers of different emission colors are formed in their respective treatment chambers 556, 511, and 512, there is no particular limitation. For example, the red-light emitting layers may be formed in the treatment chamber 555 or 513, and a practitioner can select a chamber as appropriate. Further, needless to say, the hole injecting layers, the hole transporting layers, the electron transporting layers, or the electron injecting layers can be formed in the treatment chamber 556, 511, or 512.

An example is presented here in which after setting the second substrate in the fourth cassette chamber 570, the second substrate is transferred into the second transfer chamber 552 without being transferred into another treatment chamber; however, before transferring the second substrate into the second transfer chamber 552, films may be formed on the second substrate in the treatment chamber 575 or 574, and the second substrate may be transferred into the laser light irradiation chamber 515, and layers may be stacked. In such a case, a high molecular compound such as poly(3,4-ethylenedioxythiophene)/poly(styrenesulfonate) (PEDOT/PSS) or the like can be used for the hole injecting layers on the first electrodes. As a substance having a high hole transporting property which is used for the hole injecting layers, any of various compounds such as high molecular compounds (oligomers, dendrimers, polymers, and the like) can be used.

If a PEDOT/PSS film is formed by a spin coating method, the film is formed on an entire surface; thus, it is preferable to selectively remove the film at a side face or a periphery portion of the second substrate, a terminal portion, a region in which a cathode (the second electrode) and a lower wiring are connected, and the like using a mask by $O_2$ ashing or the like in the pretreatment chamber 553. A plasma producing unit is provided for the pretreatment chamber 553, and one or plural kinds of gases selected from Ar, H, F, and O are excited to produce plasma, thereby performing dry etching. With the use of a mask, only an unnecessary portion can be removed selectively. Further, a UV irradiation mechanism may be provided for the pretreatment chamber 553 so that ultraviolet ray irradiation can be performed as surface treatment for an anode (the first electrodes). As described above, preferably, not only vacuum heating but also other treatment such as plasma treatment or UV irradiation treatment can be performed in the pretreatment chamber 553.

After forming the EL layers on the second substrate through any one of the film formation processes described above, electrodes which function as the second electrodes of the light emitting elements are formed. The second electrodes are formed by a sputtering method, an electron beam method, or the like. If a sputtering method is employed, a plasma producing unit, a sputtering target, and a means for introducing a source gas are provided for a treatment chamber 514. Since a film is formed in a face-down mode when a sputtering method or an electron beam method is employed, the second substrate can be transferred smoothly out of the laser light irradiation chamber 515 or the treatment chamber in which a resistance heating method is used.

After forming the second electrodes, the second substrate is transferred into the third delivery chamber 503 through a gate valve 540 using the transfer unit 521, and further into the sealing chamber 504 through a gate valve 541. The substrate which has undergone sealing in the sealing chamber 504 is transferred into an unload chamber 505 through a gate valve 542, and can be taken out of the manufacturing apparatus. Through the above process, light emitting diodes (also referred to as EL elements) can be manufactured.

In the manufacturing apparatus shown in FIG. 8, each treatment chamber and each transfer chamber in which the pressure is reduced are provided with their respective gate valves 530 to 535, 538, and 560 to 566.

This embodiment can be combined freely with Embodiment Mode 1, Embodiment Mode 2, or Embodiment Mode 3. With the manufacturing apparatus presented in this embodiment, a light emitting element can be optimized.

[Embodiment 2]

This embodiment describes an active matrix light emitting device which is formed using the manufacturing apparatus shown in FIG. 8, with reference to FIGS. 10A and 10B. FIG. 10A is a top view of the light emitting device, and FIG. 10B is a cross-sectional view taken along a line A-A' in FIG. 10A. A portion 1701 surrounded by a dotted line designates a driver circuit portion (a source driver circuit). A portion surrounded by a dotted line designates a pixel portion. A portion 1703 surrounded by a dotted line designates a driver circuit portion (a gate driver circuit). Further, a reference numeral 1704 designates a sealing substrate, and a reference numeral 1705 designates a sealant. Furthermore, there is a space 1707 in a portion surrounded by the sealant 1705.

A reference numeral 1708 designates a wiring for transmitting a signal input to the source driver circuit 1701 and the gate driver circuit 1703, and the wiring 1708 receives a video signal, a clock signal, a start signal, a reset signal, and the like from an flexible printed circuit (FPC) 1709, which functions as an external input terminal. Although only the FPC is shown in the drawing, a printed wiring board (PWB) may be attached to the FPC. The light emitting device in this specification includes, in its category, not only the light emitting device itself but also a light emitting device provided with an FPC or a PWB.

Next, a cross-sectional structure is described with reference to FIG. 10B. Although the driver circuit portions and the pixel portion are formed on an element substrate 1710, the pixel portion 1702 and the source driver circuit 1701 that is a driver circuit portion are shown in the drawing.

As the source driver circuit 1701, a CMOS circuit in which an n-channel TFT 1723 and a p-channel TFT 1724 are provided is formed. As a circuit included in the driver circuit, a known CMOS circuit, PMOS circuit, or NMOS circuit may be formed. This embodiment presents a driver-integrated type in which a driver circuit is formed on a substrate; however, it is not necessary to have such a structure, and the driver circuit can be formed not on the substrate but outside the substrate.

The pixel portion 1702 includes a plurality of pixels, each of which includes a switching TFT 1711, a current control TFT 1712, and an anode 1713 that is electrically connected to a drain of the current control TFT 1712. An insulator 1714 is formed so as to cover an end portion of the anode 1713. In this embodiment, the insulator 1714 is formed using a positive photosensitive acrylic resin film.

The insulator 1714 is formed so as to have a curved surface having curvature at an upper or lower end portion thereof in order to obtain favorable coverage. For example, if a positive photosensitive acrylic is used as a material of the insulator 1714, it is preferable that the insulator 1714 have a curved surface having a radius of curvature (from 0.2 μm to 3 μm) at the upper end portion. For the insulator 1714, either a negative type that becomes insoluble in an etchant by light or a positive type that becomes soluble in an etchant by light can be used. Further, the material is not limited to an organic compound, and an inorganic compound such as silicon oxide or silicon oxynitride can also be used.

A light emitting element 1715 and a cathode 1716 are formed on the anode 1713. It is preferable to form the anode 1713 using a material having a high work function. For example, the following structures can be given: a single layer of an indium tin oxide film, an indium tin oxide film including silicon, an indium zinc oxide film, a titanium nitride film, a chromium film, a tungsten film, a zinc film, a platinum film, or the like; stacked layers of a titanium nitride film and a film including aluminum as its main component; three stacked layers of a titanium nitride film, a film including aluminum as its main component, and a titanium nitride film; and the like. If the anode 1713 is formed using an indium tin oxide film and a wiring of the current control TFT 1712 connected to the anode 1713 has a stacked-layer structure of a titanium nitride film and a film including aluminum as its main component or a stacked-layer structure of a titanium nitride film, a film including aluminum as its main component, and a titanium nitride film, the wiring has low resistivity and can form a favorable ohmic contact with the indium tin oxide film, and further, the anode 1713 can function as an anode.

In the light emitting element 1715, the anode 1713, a layer 1700 including an organic compound, and the cathode 1716 are stacked; specifically, a hole injecting layer, a hole transporting layer, a light emitting layer, an electron transporting layer, and an electron injecting layer are stacked as appropriate. The light emitting element 1715 is formed by the film formation method in which material layers which are formed on a different substrate from a deposition target substrate presented in the preceding embodiment modes are heated with laser light.

The cathode 1716 may be formed using a material having a low work function (e.g., Al, Ag, Li, Ca, or an alloy thereof: MgAg, MgIn, AlLi, calcium fluoride, or calcium nitride); however, the material for the cathode 1716 is not limited to the above and can employ a variety of conductive films by selecting an appropriate electron injecting material. In a case where light emitted from the light emitting element 1715 passes through the cathode 1716, stacked layers of a thin metal film and a transparent conductive film of indium tin oxide alloy, indium zinc oxide alloy, zinc oxide, or the like can be used for the cathode 1716.

Further, the sealing substrate 1704 is attached to the element substrate 1710 using the sealant 1705, thereby obtaining a structure in which the light emitting element 1715 is provided in the space 1707 surrounded by the element substrate 1710, the sealing substrate 1704, and the sealant 1705. The space 1707 may be filled with an inert gas (e.g., nitrogen or argon), the sealant 1705, or the like.

It is preferable to use an epoxy-based resin for the sealant 1705. Further, it is preferable that such a material transmit as little moisture or oxygen as possible. As a material used for the sealing substrate 1704, a glass substrate, a quartz substrate, or a plastic substrate made of fiberglass-reinforced plastics (FRP), polyvinyl fluoride (PVF), polyester, acrylic, or the like can be used.

As described above, a light emitting device having a light emitting element can be obtained with the manufacturing apparatus shown in FIG. 8.

Further, in the light emitting device presented in this embodiment, a color conversion film such as a color filter may be provided if necessary.

As an active layer of a TFT which is provided in the pixel portion 1702, an amorphous semiconductor film, a semiconductor film including a crystalline structure, a compound semiconductor film including an amorphous structure, or the like can be used as appropriate. Alternatively, as the active layer of the TFT, a semi-amorphous semiconductor film (also referred to as a microcrystalline semiconductor film), which includes a crystalline region having a short-range order and lattice distortion, and which is a semiconductor having an intermediate structure between an amorphous structure and a crystalline structure (including a single crystal structure and a polycrystalline structure) and is in a third condition, in which the semiconductor is stable in free energy, can also be used. A crystal grain of 0.5 nm to 20 nm is included in at least part of the semi-amorphous semiconductor film, and a Raman spectrum thereof lies in lower wave numbers than 520 $cm^{-1}$.

Further, by X-ray diffraction, the diffraction peaks of (111) and (220) that are thought to be attributed to a Si crystal lattice are observed in a semi-amorphous semiconductor film. The semi-amorphous semiconductor film is made to include hydrogen or halogen of at least greater than or equal to 1 at. % to terminate dangling bonds. The semi-amorphous semiconductor film is formed by glow discharge decomposition (plasma CVD) of a source gas such as $SiH_4$, $Si_2H_6$, $SiH_2Cl_2$, $SiHCl_3$, $SiCl_4$, or $SiF_4$. The source gas may be diluted with $H_2$, or $H_2$ and one or more kinds of rare gas elements selected from He, Ar, Kr, and Ne. The dilution ratio is from 1:2 to 1:1000. The pressure is in a range of 0.1 Pa to 133 Pa, and the power source frequency is from 1 MHz to 120 MHz, preferably from 13 MHz to 60 MHz. The substrate heating temperature can be less than or equal to 300° C., preferably from 100° C. to 250° C. It is preferable that the concentration of impurities of atmospheric constituents, such as oxygen, nitrogen, and carbon, in the film be less than or equal to $1\times10^{20}/cm^3$; in particular, the concentration of oxygen be less than or equal to $5\times10^{19}/cm^3$, more preferably, less than or equal to $1\times10^{19}/cm^3$. The field effect mobility μ of a TFT in which a semi-amorphous semiconductor film is used as an active layer is from 1 $cm^2$/Vsec to 10 $cm^2$/Vsec.

This embodiment can be combined freely with Embodiment Mode 1, Embodiment Mode 2, Embodiment Mode 3, or Embodiment 1. For example, the film formation method presented in Embodiment Mode 1, which can increase use efficiency of a light emitting material and the like compared to that in a conventional method, can reduce manufacturing cost.

Although this embodiment describes an example of an active matrix display device, it is also possible to manufacture a passive matrix display device with the manufacturing apparatus presented in Embodiment 1. In a conventional method for manufacturing a passive matrix device, partitions are stacked and are shaped into a complex form, e.g., into an inversely tapered shape, and a film is deposited on an entire surface, so that the deposited film is separated with the partitions, thereby forming EL layers selectively. However, the film formation method shown in FIGS. 1A to 1C, which makes it possible to form EL layers selectively without forming complex partitions, is efficient

[Embodiment 3]

This embodiment describes a variety of electronic appliances manufactured using a light emitting device including light emitting elements formed by a film formation method of the present invention, with reference to FIGS. 11A to 11E.

Examples of the electronic appliances formed by the film formation method of the present invention include televisions, video cameras, digital cameras, goggle displays (head mount displays), navigation systems, audio reproducing devices (e.g., car audio component stereos and audio component stereos), laptop personal computers, game machines, portable information terminals (e.g., mobile computers, mobile phones, portable game machines, and electronic books), image reproducing devices provided with recording media (specifically, devices that can play recording media such as digital videodiscs (DVD) and are provided with display devices that can display reproduced images), lighting equipment, and the like. FIGS. 11A to 11E show specific examples of these electronic appliances.

Figure 11A:
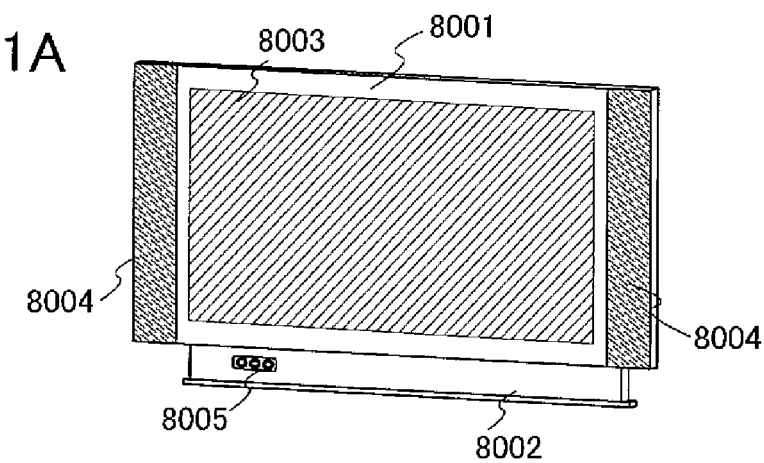
FIGS. 11A to 11E are drawings showing examples of electronic appliances.

FIG. 11A shows a display device including a chassis 8001, a supporting base 8002, display portion 8003, a speaker portion 8004, a video input terminal 8005, and the like. The display device is manufactured by using a light emitting device formed according to the present invention for the display portion 8003. The display device includes, in its category, all the devices for displaying information, e.g., for a personal computer, for receiving TV broadcast, and for displaying an advertisement. The film formation method of the present invention can achieve significant reduction in manufacturing cost, and thus can provide inexpensive display devices.

Figure 11B:
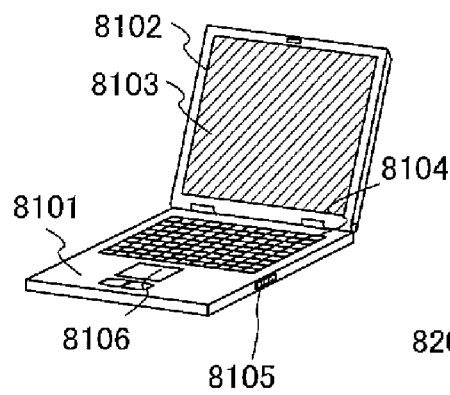

FIG. 11B shows a laptop personal computer including a main body 8101, a chassis 8102, a display portion 8103, a keyboard 8104, an external connection port 8105, a pointing device 8106, and the like. The laptop personal computer is manufactured by using a light emitting device having light emitting elements formed according to the film formation method of the present invention for the display portion 8103. The film formation method of the present invention can achieve significant reduction in manufacturing cost, and thus can provide inexpensive laptop personal computers.

Figure 11C:
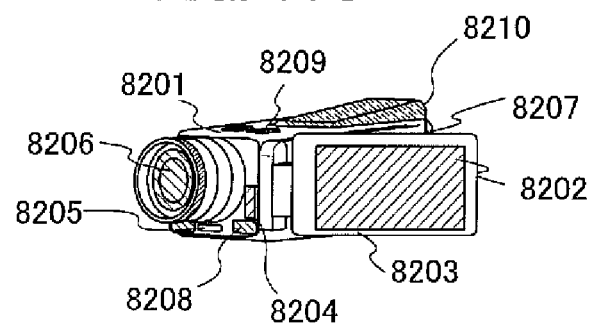

FIG. 11C shows a video camera including a main body 8201, a display portion 8202, a chassis 8203, an external connection port 8204, a remote control receiving portion 8205, an image receiving portion 8206, a battery 8207, an audio input portion 8208, operation keys 8209, an eyepiece portion 8210, and the like. The video camera is manufactured by using a light emitting device having light emitting elements formed according to the film formation method of the present invention for the display portion 8202. The film formation method of the present invention can achieve significant reduction in manufacturing cost, and thus can provide inexpensive video cameras.

Figure 11D:
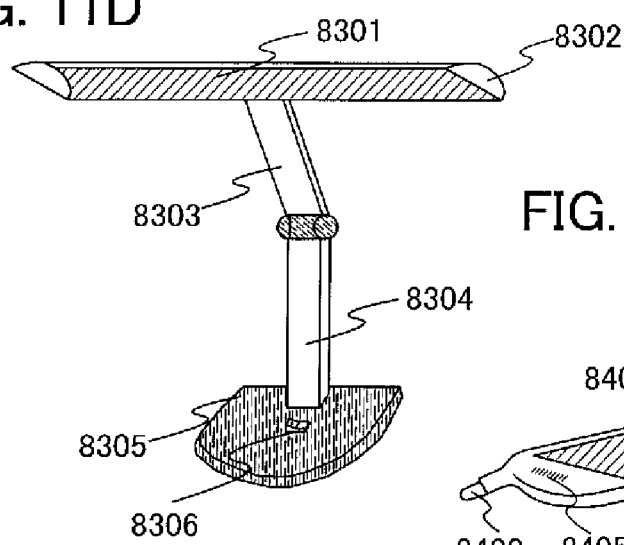

FIG. 11D shows a desk lamp including a lighting portion 8301, a shade 8302, an adjustable arm 8303, a support 8304, a base 8305, and a power supply 8306. The desk lamp is manufactured by using a light emitting device formed according to the film formation method of the present invention for the lighting portion 8301. The lighting equipment includes a ceiling light, a wall light, and the like in its category. The film formation method of the present invention can achieve significant reduction in manufacturing cost, and thus can provide inexpensive desk lamps.

Figure 11E:
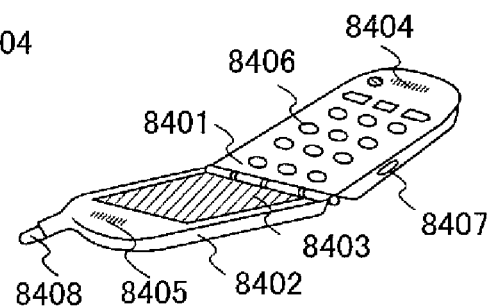

FIG. 11E shows a mobile phone including a main body 8401, a chassis 8402, a display portion 8403, an audio input portion 8404, an audio output portion 8405, operation keys 8406, an external connection port 8407, an antenna 8408, and the like. The mobile phone is manufactured by using a light emitting device having light emitting elements formed according to the film formation method of the present invention for the display portion 8403. The film formation method of the present invention can achieve significant reduction in manufacturing cost, and thus can provide inexpensive mobile phones.

In the above manner, electric appliances and lighting equipment in which light emitting elements formed by the film formation method of the present invention are used can be obtained. The applicable range of a light emitting device having light emitting elements formed by the film formation method of the present invention is so wide that this light emitting device can be applied to electric appliances in a variety of fields.

This embodiment can be combined freely with Embodiment Mode 1, Embodiment Mode 2, Embodiment Mode 3, Embodiment 1, or Embodiment 2.

This application is based on Japanese Patent Application serial No. 2008-058563 filed with Japan Patent Office on Mar. 7, 2008, the entire contents of which are hereby incorporated by reference.

What is claimed is:
1. A method for forming a film, comprising:
 forming an island shaped light absorption layer on a first surface of a first substrate;
 forming a partition surrounding the island shaped light absorption layer, the partition separated from the island shaped light absorption layer by a space;
 forming a material layer which includes a material and is directly in contact with the island shaped light absorption layer;
 disposing a second substrate so that the material layer faces the second substrate;
 irradiating the island shaped light absorption layer with a light from a second surface of the first substrate which is opposite to the first surface so that at least a part of the material layer is heated, thereby forming a film including the material on the second substrate,
 wherein the part of the material layer is directly in contact with the island shaped light absorption layer.

2. The method according to claim 1, wherein the material layer is formed using a droplet discharge apparatus.

3. The method according to claim 1, wherein the material layer comprises an organic compound.

4. The method according to claim 1, wherein a thickness of the island shaped light absorption layer is 10 nm to 600 nm inclusive.

5. The method according to claim 1, wherein the light is a laser light with a repetition rate of greater than or equal to 10 MHz and a pulse width of 100 fs to 10 ns inclusive.

6. A method for forming a film, comprising:
 forming an island shaped light absorption layer on a first surface of a first substrate;
 forming a partition surrounding the island shaped light absorption layer, the partition separated from the island shaped light absorption layer by a space;
 discharging a droplet to a surface of the island shaped light absorption layer to form a material layer including a material and directly in contact with the island shaped light absorption layer;
 disposing a second substrate so that the material layer faces the second substrate;
 irradiating the island shaped light absorption layer with a light from a second surface of the first substrate which is opposite to the first surface so that at least a part of the material layer is heated, thereby forming a film including the material on the second substrate,
 wherein the part of the material layer is directly in contact with the island shaped light absorption layer.

7. The method according to claim 6, wherein a height of the partition is larger than a thickness of the island shaped light absorption layer.

8. The method according to claim 6, wherein the material layer comprises an organic compound.

9. The method according to claim 6, wherein a thickness of the island shaped light absorption layer is 10 nm to 600 nm inclusive.

10. The method according to claim 6, wherein the light is laser light with a repetition rate of greater than or equal to 10 MHz and a pulse width of 100 fs to 10 ns inclusive.

11. A method for manufacturing a light emitting device, comprising:
 forming a first electrode over a first substrate;
 forming an island shaped light absorption layer on a first surface of a second substrate;
 forming a partition surrounding the island shaped light absorption layer, the-partition separated from the island shaped light absorption layer by a space;

discharging a droplet to a surface of the island shaped light absorption layer to form a material layer including a material and directly in contact with the island shaped light absorption layer;

disposing the second substrate so that the first electrode faces the material layer;

irradiating the island shaped light absorption layer with a light from a second surface of the second substrate which is opposite to the first surface so that at least a part of the material layer is heated, thereby forming a film including the material on the first electrode, wherein the part of the material layer is directly in contact with the island shaped light absorption layer.

12. The method for manufacturing a light emitting device according to claim 11, wherein the material layer is formed using a droplet discharge apparatus.

13. The method for manufacturing a light emitting device according to claim 11, wherein the material layer comprises an organic compound.

14. The method for manufacturing a light emitting device according to claim 11, wherein a thickness of the island shaped light absorption layer is 10 nm to 600 nm inclusive.

15. The method for manufacturing a light emitting device according to claim 11, wherein the light is laser light with a repetition rate of greater than or equal to 10 MHz and a pulse width of 100 fs to 10 ns inclusive.

* * * * *